(12) United States Patent
Jerrett et al.

(10) Patent No.: US 9,420,772 B2
(45) Date of Patent: Aug. 23, 2016

(54) APPARATUS AND METHOD FOR HARVESTING AQUATIC ANIMALS

(71) Applicants: Alistair Renfrew Jerrett, Nelson (NZ); Gerard John Janssen, Richmond (NZ); Suzanne Elaine Black, Nelson (NZ)

(72) Inventors: Alistair Renfrew Jerrett, Nelson (NZ); Gerard John Janssen, Richmond (NZ); Suzanne Elaine Black, Nelson (NZ)

(73) Assignee: THE NEW ZEALAND INSTITUTE FOR LAND AND FOOD RESEARCH LIMITED, Mt Albert, Auckland (NZ)

( * ) Notice: Subject to any disclaimer, the term of this patent is extended or adjusted under 35 U.S.C. 154(b) by 469 days.

(21) Appl. No.: 13/832,133

(22) Filed: Mar. 15, 2013

(65) Prior Publication Data
US 2014/0259861 A1 Sep. 18, 2014

(51) Int. Cl.
*A01K 73/02* (2006.01)
*A01K 73/00* (2006.01)
*A01K 74/00* (2006.01)

(52) U.S. Cl.
CPC ............... *A01K 73/02* (2013.01); *A01K 73/00* (2013.01); *A01K 74/00* (2013.01); *Y10T 29/49826* (2015.01)

(58) Field of Classification Search
CPC ........ A01K 73/00; A01K 73/02; A01K 75/00
USPC ................................. 43/4.5, 7–9.95
See application file for complete search history.

(56) References Cited

U.S. PATENT DOCUMENTS

| 2,721,411 A | 10/1955 | Pedersen |
| 2,890,543 A * | 6/1959 | Mitchell ............... A01K 73/02 43/9.1 |
| 3,461,591 A * | 8/1969 | Brown .................. A01K 80/00 43/8 |
| 3,747,250 A * | 7/1973 | Willinger .......................... 43/11 |

(Continued)

FOREIGN PATENT DOCUMENTS

| CN | 201580537 | 9/2010 |
| CN | 202364687 U | 8/2012 |

(Continued)

OTHER PUBLICATIONS

Michael Gerner and David Maynard, At-sea testing of the witches hat bycatch reduction device enhancer in the Northern Prawn Fishery, Jul. 2010.
Cha, Bong-Jin et. al., Development of a bycatch reduction device for shrimp beam trawl using flexible materials, Iranian Journal of Fishery Sciences, 2012.
International Search Report and Written Opinion from PCT/IB2013/055858 dated Nov. 20, 2013.

*Primary Examiner* — Marc Burgess
(74) *Attorney, Agent, or Firm* — Warner Norcross & Judd LLP

(57) ABSTRACT

An apparatus for harvesting aquatic animals has a cod end portion and an elongate lengthener portion. The cod end portion has an open leading end and a closed trailing end and side wall(s), the side wall(s) and the trailing end being substantially impervious to water. The elongate lengthener portion has a leading end, a trailing end, and side wall(s), at least a major part of the side wall(s) comprising a material substantially impervious to water. The trailing end of the lengthener portion is operatively connected to the leading end of the cod end portion. The elongate lengthener portion comprises a plurality of escapements through which water can pass from an interior to an exterior of the apparatus to cause a general reduction in the water flow rate inside the apparatus when the apparatus is submerged in a body of water and there is water flow relative to the apparatus.

25 Claims, 29 Drawing Sheets

(56) References Cited

U.S. PATENT DOCUMENTS

| | | | |
|---|---|---|---|
| 3,793,760 A | | 2/1974 | Puretic |
| 4,063,380 A | | 12/1977 | Grim |
| 4,089,131 A | * | 5/1978 | Phillips ............................ 43/4 |
| 4,399,629 A | * | 8/1983 | Duncan ............................ 43/4 |
| 4,402,154 A | | 9/1983 | Pence |
| 4,932,150 A | * | 6/1990 | Sher ................... A01K 77/00 43/11 |
| 6,223,462 B1 | * | 5/2001 | Johannesson ................ 43/9.2 |
| 6,343,433 B1 | * | 2/2002 | Granberg ...................... 43/6.5 |
| 6,883,265 B1 | | 4/2005 | Jenssen |
| 7,685,762 B2 | * | 3/2010 | Parsons ......................... 43/9.2 |
| 8,191,305 B2 | * | 6/2012 | Gallagher ............ A01K 73/02 43/9.1 |
| 2004/0244264 A1 | | 12/2004 | Safwat |
| 2006/0272196 A1 | | 12/2006 | Safwat et al. |

FOREIGN PATENT DOCUMENTS

| | | |
|---|---|---|
| GB | 711707 | 7/1954 |
| NZ | 500621 | 11/2001 |
| NZ | 518578 | 6/2003 |
| SU | 1681800 | 10/1991 |
| WO | 2004032616 | 4/2004 |
| WO | 2007108702 | 9/2007 |
| WO | 2008064939 | 6/2008 |
| WO | 2008064939 A1 | 6/2008 |

* cited by examiner

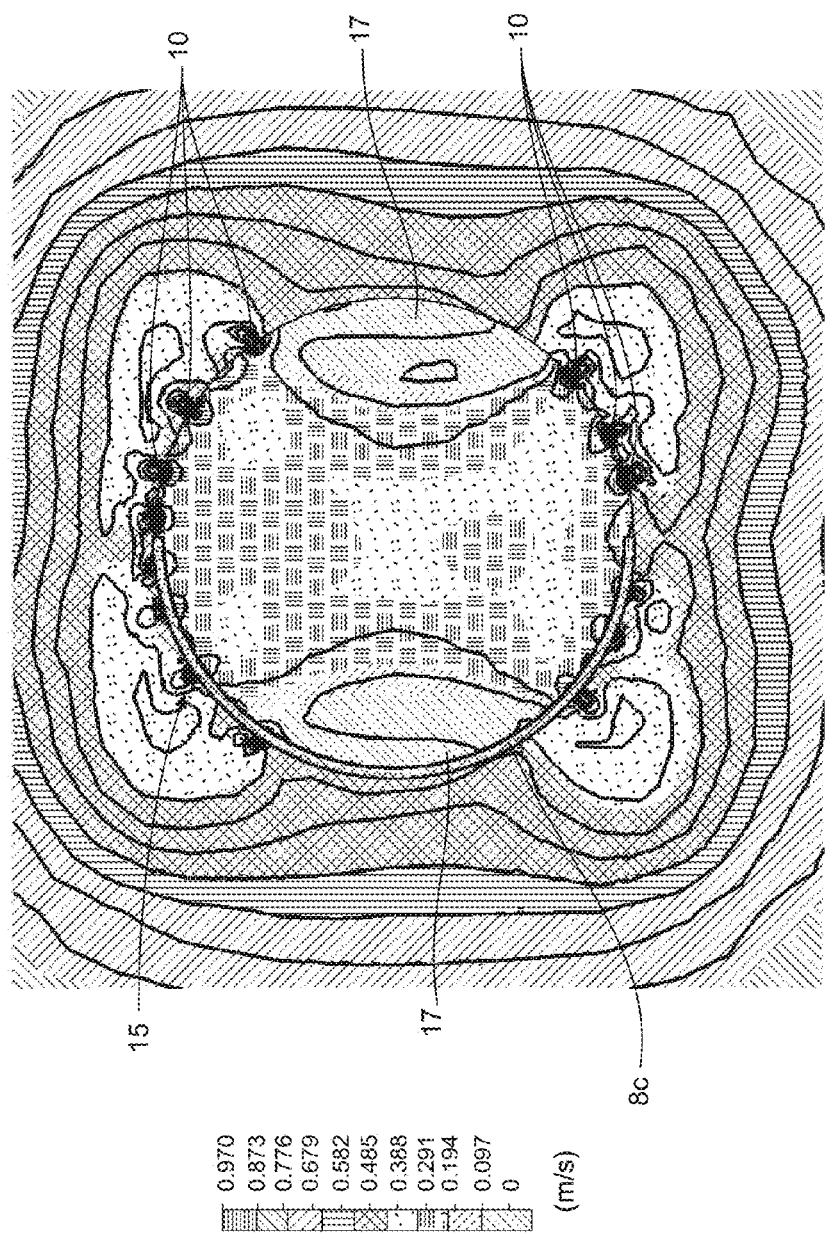
FIGURE 18(iii)

APPARATUS AND METHOD FOR HARVESTING AQUATIC ANIMALS

FIELD OF THE INVENTION

This invention relates to an apparatus and method for harvesting aquatic animals. In one embodiment, the apparatus and method are suitable for trawl harvesting of aquatic animals. The apparatus may be suitable for storing and treating aquatic animals.

BACKGROUND

Aquatic animal harvesting apparatuses such as fishing and trawling nets traditionally comprise a net that is towed under water by a towing vessel such as a boat. The nets comprise a mouth, lengthener, and a trailing 'cod end'.

Traditionally nets are designed to be high strength and to have high porosity to water. During towing, a large volume of water flows through the entire length of the net, and aquatic animals are transported by the flow towards the trailing 'cod end' of the net. The animals are either retained in the cod-end or swept through the openings in the lengthener modules or cod-end mesh. The size of the aquatic animals captured depends on the grade of netting or mesh in the net; aquatic animals smaller than the net apertures are generally able to escape through the net.

The resistance of the net as it is towed through the water produces turbulence within the net that acts to tire the animals. These internal water flow patterns change with the volume of retained catch. Exhausted animals are tumbled constantly against each other and against the mesh. Even organisms much smaller than the mesh are often damaged through contact with the mesh strands or with other organisms. The contact between animals increases as the net fills. As the cod end fills with animals, a pressure wave may be created in front of the cod end, forcing animals into the net ahead of the cod end. This often causes the fish to become stuck or meshed in the net. As well as being damaging, meshed animals are labour intensive to remove.

Trawl nets most commonly comprise a diamond net structure, but some nets comprise a square mesh. Diamond meshes tend to collapse when they are empty or 'neck' down under the tension caused by a bolus of fish in the cod end of the net. When the meshes collapse, small fish are unable to escape, increasing the amount of by-catch. Square meshes are advantageous because they are more dimensionally stable under tension but tend to be expensive and are mechanically less forgiving that diamond mesh structures.

Even aquatic animals that are eventually ejected through conventional mesh systems often sustain un-survivable damage and levels of exhaustion.

Generally the longer a traditional net is towed through the water, the greater the damage sustained to the captured animals. Therefore, traditional nets cannot retain fish or other aquatic animals for extended periods of time in good condition and the nets must be emptied frequently.

When a traditional net is hauled out of the water and onto a boat, the fish may be further crushed against each other and the edge of the boat as the water drains from the net, exacerbating damage to the catch. This tissue damage can limit the utility and value of organisms caught. It is not uncommon for more than 50% of a catch to be unwanted or discarded in some fisheries. The impacting of the animals with each other also causes stress to the captured animals. This stress is undesirable as it causes autolytic spoilage, reducing the quality of the catch. It is known in meat processing that minimising stress to animals before slaughter improves the quality of the meat.

In addition, when a catch is brought on board in a traditional net, the catch is exposed through the net apertures. Detritus from the catch escapes through the net, attracting predators and scavengers such as birds, seals, sea lions, sharks and fur seals.

Attempts have been made to enhance the selectivity of trawl nets using rigid or flexible gratings or grids. These grids generally have the advantage that they do not collapse under tension, but they do not reduce inter-animal or animal-net contact and so do not reduce the damage to the catch.

WO 2008/064939 describes a trawl netting arrangement in which the minimum size of the fish caught is determined by the grade of the netting in the cod-end. The cod end portion contains escapements for species discrimination. The net contains internal ramps to direct fish out of the escapements and to increase the water flow rate near the escapements. There is a small reduction in flow rate in the netting arrangement drops from 100% of the tow speed at the mouth of the tapered trawl portion, to 60% at the end of the cod portion. Hydrodynamic kites are used to keep the net expanded.

Again in this arrangement, fish not ejected through the escapements remain in the net and may be forced against the end of the net. As the net fills up with fish, the fish are forced against each other and against the net. Again, when the net is hauled out of the water and onto a boat, the fish may be further crushed against each other.

WO 2004/032616 describes a trawl net having an impermeable closed end, for use in mid or bottom trawling. The trawl net is made up of a cylindrical netting portion attached to a standard trawl portion. At the end of the netting portion is an impermeable, closed cylindrical end, held in shape by external rings. While this impermeable end section may keep captured fish in a pool of water as the net is raised onto the ship's deck, the apparatus would have a significant flow rate of water back to the closed cylindrical end, which would cause fish to be forced against the netting portion in front of the impermeable closed end during trawling.

U.S. Pat. No. 6,883,265 describes a bag for transporting live fish that have already been harvested. The bag is towed along on or near the surface of a body of water. The bag contains a cylindrical tubular section made from a water-impermeable material. The bag has a mesh region covering the entrance and exit of the bag. Due to the leading and trailing mesh regions of the bag, that bag would not be suited to harvesting of aquatic animals. The bag is designed to keep fish contained during transportation. The bag also requires bag rings or other devices to keep the bag expanded. The flow rate of water through the bag is constant along the length of the bag.

U.S. Pat. No. 2,721,411 describes a trawl net with an open trailing end that feeds into an attached, rigid container with substantially impermeable walls for collecting and towing the captured fish. A flexible impervious flap is provided at the mouth of the container, which lowers when the container is full to prevent fish escaping. The rigid container contains a number of apertures sized to facilitate some water 'sluicing' through the container. Those apertures would be prone to blocking, and the rigid apparatus would be cumbersome and dangerous to handle onboard a marine vessel. In the net in U.S. Pat. No. 2,721,411 there is likely to be a significant flow of water through the net adjacent the entry to the container. That flow would force fish against the netting, damaging the catch.

There is therefore a need for an apparatus and method that enable aquatic animals to be harvested, while minimising both physical damage to the aquatic animals and the stress induced in the harvesting process to improve the quality of the aquatic animals that are harvested.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least a preferred embodiment of the present invention to provide an apparatus and method of harvesting aquatic animals that addresses at least one of the abovementioned disadvantages, and/or to at least provide the public with a useful choice.

SUMMARY OF THE INVENTION

In accordance with a first aspect of the present invention, there is provided an apparatus for harvesting aquatic animals, comprising:

a cod end portion having an open leading end and a closed trailing end and one or more side walls between the leading end and the trailing end, wherein the side wall(s) and the trailing end are substantially impervious to water; and an elongate lengthener portion having a leading end, a trailing end, and one or more side wall(s) between the leading end and the trailing end, wherein at least a major part of the side wall(s) comprise(s) a material that is substantially impervious to water, and wherein the trailing end of the lengthener portion is operatively connected to the leading end of the cod end portion;

wherein the elongate lengthener portion comprises a plurality of escapements through which water can pass from an interior of the apparatus to an exterior of the apparatus to cause a general reduction in the water flow rate inside the apparatus from the leading end of the elongate lengthener portion toward the trailing end of the cod end portion when the apparatus is submerged in a body of water and there is water flow relative to the apparatus.

The apparatus may be configured such that when the apparatus is submerged and there is water flow relative to the apparatus, the average water velocity in the cod end portion relative to the apparatus is less than about 10% of the relative water velocity outside the apparatus. The apparatus may be configured such that when the apparatus is submerged and there is water flow relative to the apparatus, the average water velocity in the cod end portion relative to the apparatus is less than about 5% of the relative water velocity outside the apparatus.

In one embodiment, said material that is substantially impervious to water comprises a membrane and the escapements are formed in the membrane.

At least one of the escapements may comprise a slit in the side wall or one of the side walls of the elongate lengthener portion. The slit may be curved and/or may comprise an anti-tear aperture at each end of the slit. Alternatively or additionally at least one of the escapements may comprise a slot or other aperture in the side wall or one of the side walls of the elongate lengthener portion.

The elongate lengthener portion may comprise an escapement portion wherein an upper region of the escapement portion comprises a plurality of escapements, a lower region of the escapement portion comprises a plurality of escapements, and two opposite side regions of the escapement portion are substantially impervious to water. Additionally or alternatively, the elongate lengthener portion may comprise an escapement portion wherein an upper region of the escapement portion is substantially impervious to water, a lower region of the escapement portion is substantially impervious to water, and two opposite side regions of the escapement portion comprises a plurality of escapements.

The elongate lengthener portion may comprise a plurality of lengthener modules arranged in series, for example, the elongate lengthener may comprise 2, 3, 4, 5, or more lengthener modules, each lengthener module having a leading end and a trailing end.

The plurality of lengthener modules may comprise a first escapement module comprising a plurality of escapements. The lengthener modules may further comprise an extension module that is substantially impervious to water. An embodiment further comprises a second escapement module comprising a plurality of escapements, with the extension module positioned between the first and second escapement modules. In a further embodiment, the first escapement module is positioned forward of the second escapement module, and the plurality of escapements in the first escapement module are larger than the plurality of escapements in the second escapement module. The lengthener modules may comprise an extension module that is in mesh form or that has apertures, but which do not have escapements for fish.

In an embodiment, each lengthener module has an average transverse internal dimension that is substantially the same for the plurality of lengthener modules. Preferably the cod end portion has an average transverse internal dimension that is substantially the same as that for the plurality of lengthener modules. In a further embodiment, the side wall(s) of the lengthener portion and/or the side wall(s) of the cod end portion is/are substantially parallel when the apparatus is expanded. In a further embodiment, the elongate lengthener portion and/or the side wall(s) of the cod end portion is/are substantially cylindrical when the apparatus is expanded.

The trailing end of the cod end portion may be internally concave when the apparatus is expanded.

The elongate lengthener portion may comprise a tapered entry cone having one or more wall(s) that is/are substantially impervious to water, the entry cone comprising a leading end defining the mouth of the lengthener portion and trailing end, wherein the internal dimension of the entry cone is greater than the internal dimension of the trailing end.

In a preferred embodiment, the side wall(s) of the cod end portion and the elongate lengthener portion are flexible, and the apparatus is collapsible and expandable.

The apparatus may be configured such that when the apparatus is submerged and there is water flow relative to the apparatus, the total open area provided by the escapements is less than 5% of the total wall area of the lengthener portion. In one embodiment, the total open area provided by the escapements is less than about 3% of the total wall area of the lengthener portion.

In one embodiment, the apparatus is configured such that when the apparatus is submerged and there is water flow relative to the apparatus, the total open area provided by the escapements is less than about 60% of the cross sectional area of the front of leading end of the lengthener portion.

In an embodiment, the escapements are configured to allow the passage of aquatic animals that are smaller than a desired size through the escapements from the interior of the apparatus to the exterior of the apparatus.

In an embodiment, the cod end portion is configured such that aquatic animals in the cod end portion will be retained and cushioned in water when the apparatus is pulled onto a boat from its leading end.

In accordance with a second aspect of the present invention, there is provided an apparatus for harvesting aquatic animals, comprising:

a cod end portion that is substantially impervious to water other than an open leading end thereof; and an escapement module operatively connected to the cod end portion and positioned forward of the open leading end of the cod end portion, having an open leading end, an open trailing end, and a wall portion between the open leading end and the open trailing end, wherein the wall portion comprises a flexible membrane, at least a major part of the wall portion being substantially impervious to water, and wherein a plurality of escapements are formed in the flexible membrane of the wall portion;

wherein water can pass through the escapements, from an interior of the apparatus to an exterior of the apparatus to cause a general reduction in the water flow rate inside the apparatus from the leading end of the escapement module toward a trailing end of the cod end portion when the apparatus is submerged in a body of water and there is water flow relative to the apparatus.

The apparatus of the second aspect may have any one or more of the features outlined in relation to the first aspect above.

In accordance with a third aspect of the present invention, there is provided a method of harvesting aquatic animals comprising the steps of:

submerging an apparatus as outlined in relation to the first or second aspect above in a body of water and positioning and/or moving the apparatus such that there is water flow relative to the apparatus and so that the flow rate of water inside the apparatus generally reduces from the leading end of the elongate lengthener portion toward the trailing end of the cod end portion; and capturing aquatic animals in the apparatus while providing a relaxed low flow rate environment for the aquatic animals in the apparatus.

The method may comprise towing the apparatus through the body of water. Alternatively the method may comprise placing the apparatus in a body of flowing water, such as a river, and holding the apparatus stationary.

The method may comprise generating a water velocity in the cod end portion relative to the apparatus of less than about 10% of the relative water velocity outside the apparatus. In one embodiment, the method comprises generating a water velocity in the cod end portion relative to the apparatus of less than about 5% of the relative water velocity outside the apparatus.

In an embodiment, the method comprises allowing aquatic animals that are smaller than a desired size to escape through the escapement(s).

The method may further comprise the step of raising the apparatus from its leading end until the leading end of the apparatus is on or over a delivery area for the animals, while maintaining aquatic animals in the cod end portion in a pool of water. Aquatic animals of at least a desired size may flow back into the cod end portion as the apparatus is raised. In one embodiment, the method further comprises raising the trailing end of the cod portion and thereby causing water and animals to flow out of the apparatus.

The delivery may be onboard a marine vessel.

The method may further comprise collapsing and rolling the apparatus around a drum.

In accordance with a fourth aspect of the present invention, there is provided a method of assembling an apparatus for harvesting aquatic animals comprising the steps of:

providing a cod end portion having an open leading end and a closed trailing end and one or more side walls between the leading end and the trailing end, wherein the side wall(s) and the trailing end are substantially impervious to water;

providing a first escapement module having a leading end, a trailing end, and one or more side wall(s) between the leading end and the trailing end, wherein at least a major part of the side wall(s) comprise(s) a material that is substantially impervious to water, and comprising a plurality of escapements through the side wall(s); and operatively connecting the trailing end of the first escapement module to the leading end of the cod end portion so as to form an apparatus in which, when the apparatus is submerged and there is water flow relative to the apparatus, water can pass from an interior of the apparatus to an exterior of the apparatus to cause a general reduction in the water flow rate inside the apparatus from the leading end of the escapement module toward the trailing end of the cod end portion.

The method of assembling may comprise providing a second escapement module having a plurality of escapements, and operatively attaching a leading end of the second escapement module to the trailing end of the first escapement module, and a trailing end of the second escapement module to the leading end of the cod end portion, so that the second escapement module is positioned between the first escapement module and the cod end portion. In a further embodiment the method comprises providing an extension module that is substantially impervious to water, and operatively attaching a leading end of the extension module to the trailing end of the first escapement module, and a trailing end of the extension module to the leading end of the second escapement module, so that the extension module is positioned between the first escapement module and the second escapement module.

Adjacent modules and the cod end may be operatively attached by stitching adjacent modules together.

The cod end portion, escapement module(s) and/or the extension module provided in embodiments of the method according to the third aspect may comprise any one or more of the features described above in relation to the apparatus of the first aspect.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The term 'comprising' as used in this specification means 'consisting at least in part of'; that is to say when interpreting statements in this specification which include 'comprising', the features prefaced by this term in each statement all need to be present but other features can also be present. Related terms such as 'comprise' and 'comprised' are to be interpreted in a similar manner.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which:

FIG. 18(*i*) is taken through line A-A of FIG. 3 through the first escapement module; FIG. 18(*ii*) is taken through line B-B of FIG. 3 through the extension module; FIG. 18(*iii*) is taken through line C-C of FIG. 3 through the second escapement module; and FIG. 18(*iv*) is taken through line D-D of FIG. 3 through the cod end portion;

DETAILED DESCRIPTION OF EMBODIMENTS OF THE INVENTION

Figure 1:
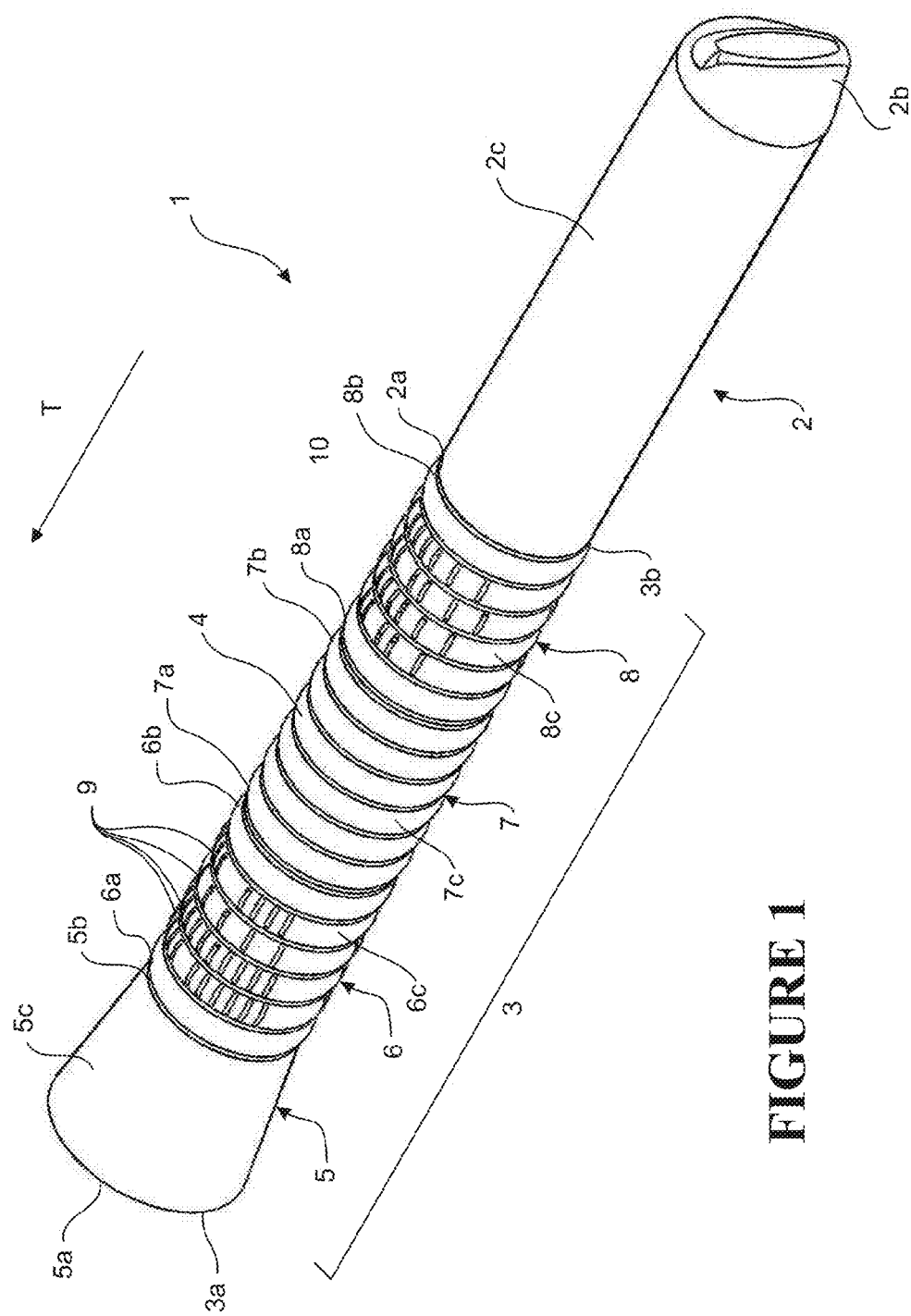
FIG. 1 is a rear overhead perspective view of an apparatus in accordance with a first embodiment of the present invention.

FIGS. 1 to 7 illustrate an apparatus 1 for harvesting aquatic animals in accordance with an embodiment of the invention. In the embodiment shown, the apparatus 1 is configured as a trawling apparatus for pelagic or bottom trawling, for capturing aquatic animals such as finfish such as hoki, alfonsino, snapper, trevally, gurnard, barracouta, or flatfish, molluscs such as squid, and/or crustaceans such as crabs for example. FIGS. 1 to 7 show the apparatus in an expanded configuration, in use. In a preferred form, the apparatus 1 replaces the mesh cod end on a traditional trawling net.

The apparatus is a modular bag 1 comprising a trailing cod end portion 2, having an open leading end 2a, a closed trailing end 2b, and one or more side walls 2c extending between the leading end and the trailing end. The apparatus further comprises an elongate lengthener portion 3, having an open trailing end 3b operatively connected to the open leading end 2a of the cod end portion 2, and an open leading end 3a that forms an open mouth of the apparatus.

Figure 13:
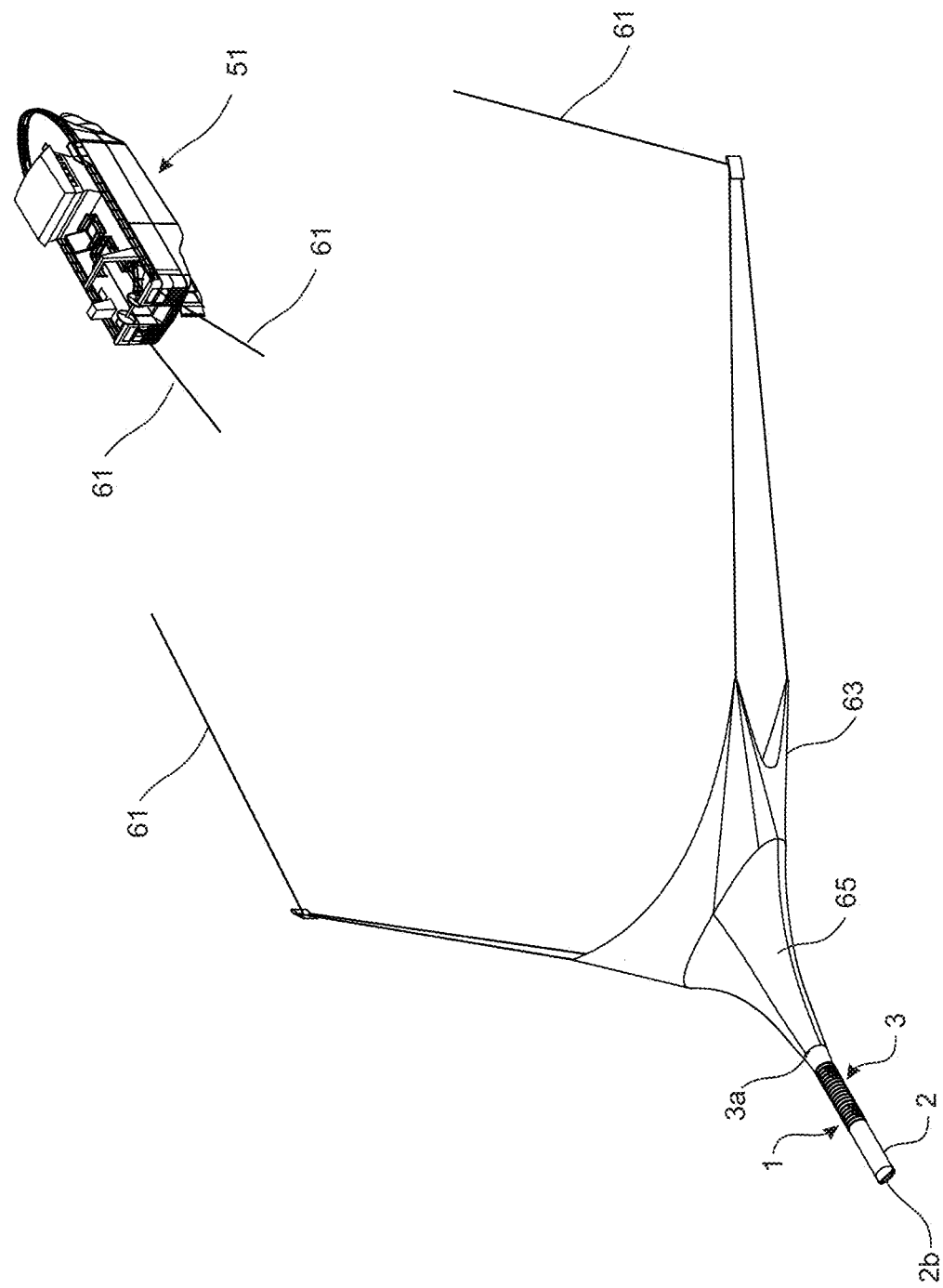
FIG. 13 is an overhead perspective view schematically showing the apparatus of FIGS. 1 to 3 attached to sweep wings, and being towed in a body of water behind a marine vessel.

The leading end 3a of the lengthener portion 3 is operatively connected to diverging sweep wings 63 and/or to the bosom 65 of the net as shown in FIG. 13, to direct aquatic animals into the apparatus 1. The sweep wings 63 are in turn operatively connected to a towing marine vessel 51 such as a boat by way of cables 61 or the like. The apparatus 1 is configured to be towed in a towing direction T through the body of water by the towing vessel 51. The sweep wings 63 and cables 61 can be a conventional design. The apparatus 1 of the present invention can be provided as an entire trawling apparatus including sweep wings and cables, or alternatively could be retrofitted to an existing trawling net, by operatively connecting the apparatus to sweep wings or a bosom of the existing trawling net. Adapter sections could be used, if necessary, to adapt the apparatus to trawl nets used for different purposes, such as mid-water or bottom trawling for example.

The elongate lengthener portion 3 comprises an entry cone 5 and three lengthener modules 6, 7, 8 connected in series. The entry cone 5 is positioned at the leading end 3a of the lengthener portion. The entry cone comprises an open leading end 5a that forms the open mouth of the apparatus, and a trailing end 5b connected to the leading end 6a of the first lengthener module 6. The wall(s) 5c of the entry cone 5 tapers from the leading end 5a to the trailing end 5b, to direct water and animals into the lengthener modules 6, 7, 8 as the apparatus 1 is towed through the water. The cod end 2, entry cone 5, and lengthener modules 6, 7, 8 are configured to be coaxial when the apparatus 1 is expanded.

Each lengthener module 6, 7, 8 has an open leading end 6a, 7a, 8a, an open trailing end 6b, 7b, 8b, and one or more walls 6c, 7c, 8c extending between the respective leading and trailing ends. The leading end 6a of the first lengthener module 6 is operatively connected to the trailing end 5b of the entry cone 5. The leading end 7a of the second lengthener module 7 is operatively connected to the trailing end 6b of the first lengthener module 6. Similarly, the leading end 8a of the third lengthener module 8 is operatively connected to the trailing end 7b of the second lengthener module 7, and the trailing end 8b is operatively connected to the leading end 2a of the cod end portion 2.

The side wall 2c and the trailing end 2b of the cod end portion 2 are substantially impervious to water and preferably are totally impervious to water. At least a major part of the side walls 5c, 6c, 7c, 8c of the entry cone and lengthener modules are also substantially impervious to water. In a preferred embodiment, the seal at the trailing end 2b of the cod end portion 2 is achieved through rolling cod end portion wall(s) 2c, then lacing reinforcing members on the outer surface of the walls 2 with a chain stitch.

The walls 2c, 3c, 5c, 6c, 7c, 8c of the cod end, entry cone, and lengthener portions are also flexible, such that the apparatus 1 is collapsible and expandable between a collapsed configuration and an inflated or expanded configuration. The empty apparatus is likely, for example, to be stored on a boat in the collapsed state. When the apparatus is towed in a body of water, such that the flow of water is substantially parallel to the longitudinal axis of the apparatus, internal water pressure causes the apparatus to self-inflate.

The side wall portions or side walls 2c, 6c, 7c, 8c of the lengthener modules 6, 7, 8 and cod end 2 are substantially parallel when the apparatus is expanded. Portions of the walls may bow or bulge outwards under the internal pressure in the apparatus 1, as shown, i.e. such that portions of the walls are inwardly concave. The cod end 2 and elongate lengthener portion 3 are substantially cylindrical (aside from the entry cone) when the apparatus is expanded. In alternative embodiments, rather than having a circular cross section, the cod end 2 and/or the lengthener portion 3 may have a different cross-sectional configuration when the apparatus is expanded, such as an elliptical or polygonal configuration. By way of example, the lengthener portion may have a substantially square, rectangular, hexagonal, or octagonal cross-sectional configuration when the apparatus is expanded.

The trailing end 2b of the cod end portion may be at least partially internally concave when the apparatus is expanded, as shown in FIG. 1.

Figure 2:
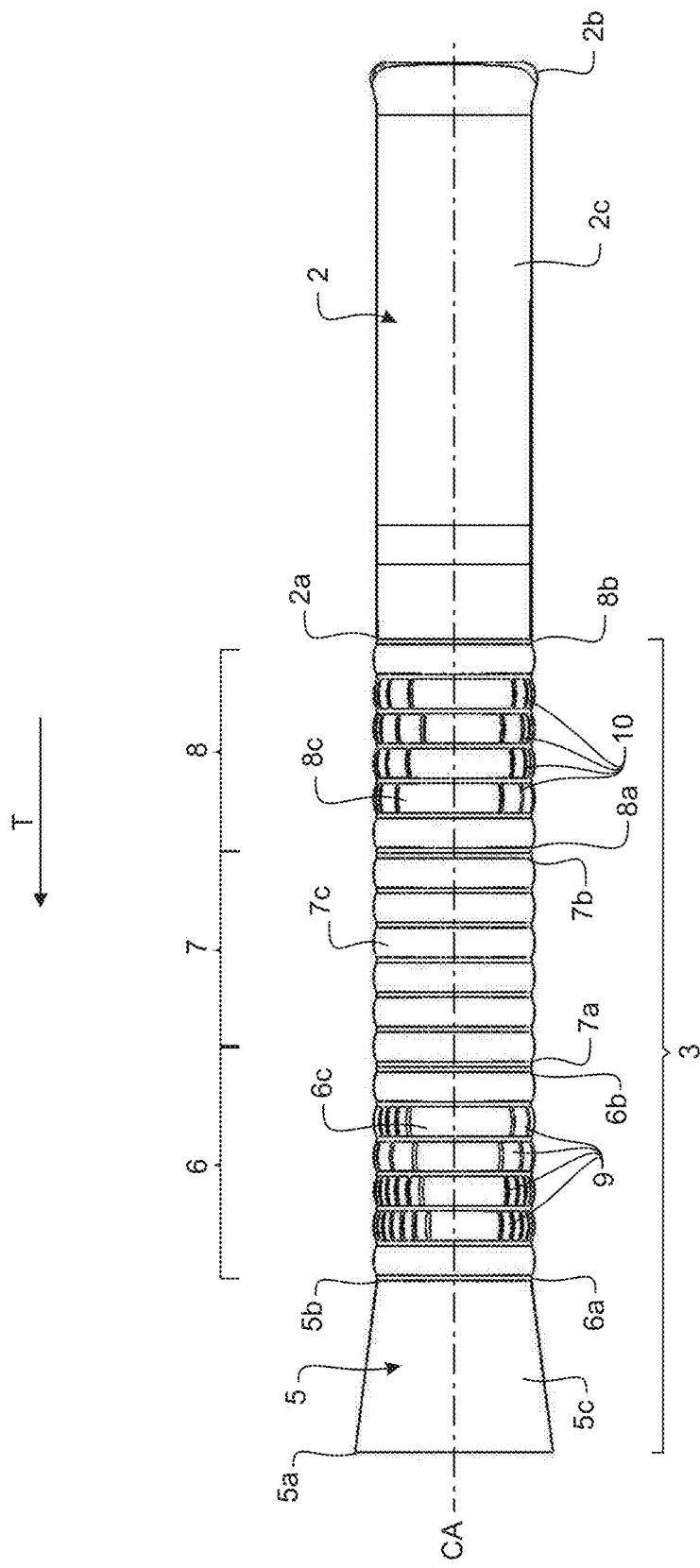
FIG. 2 is a side view of the apparatus of FIG. 1.
Figure 3:
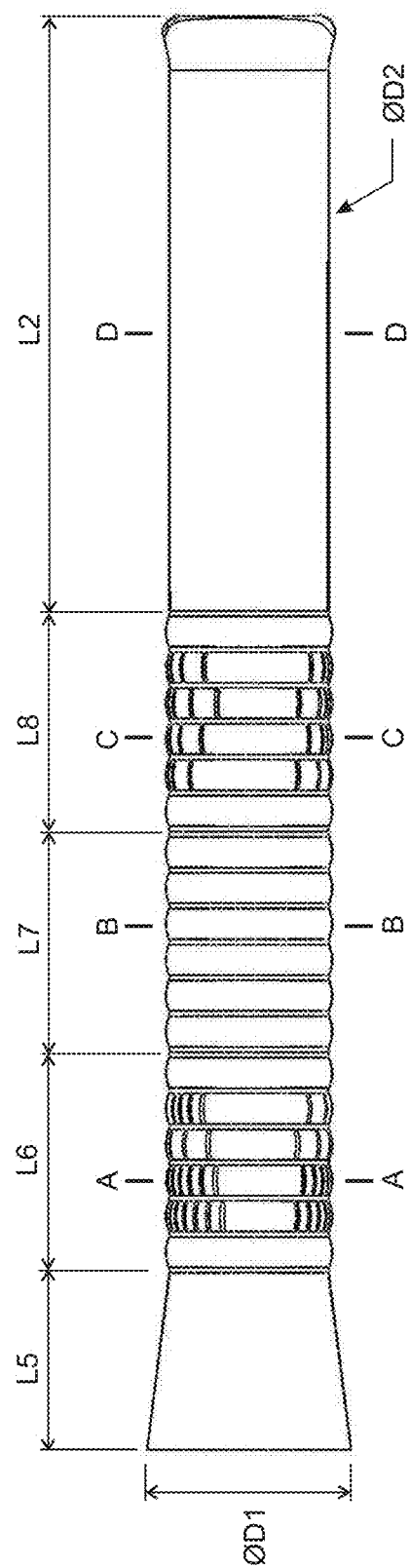
FIG. 3 is the side view of FIG. 2 showing exemplary dimensions of the apparatus.
Figure 4:
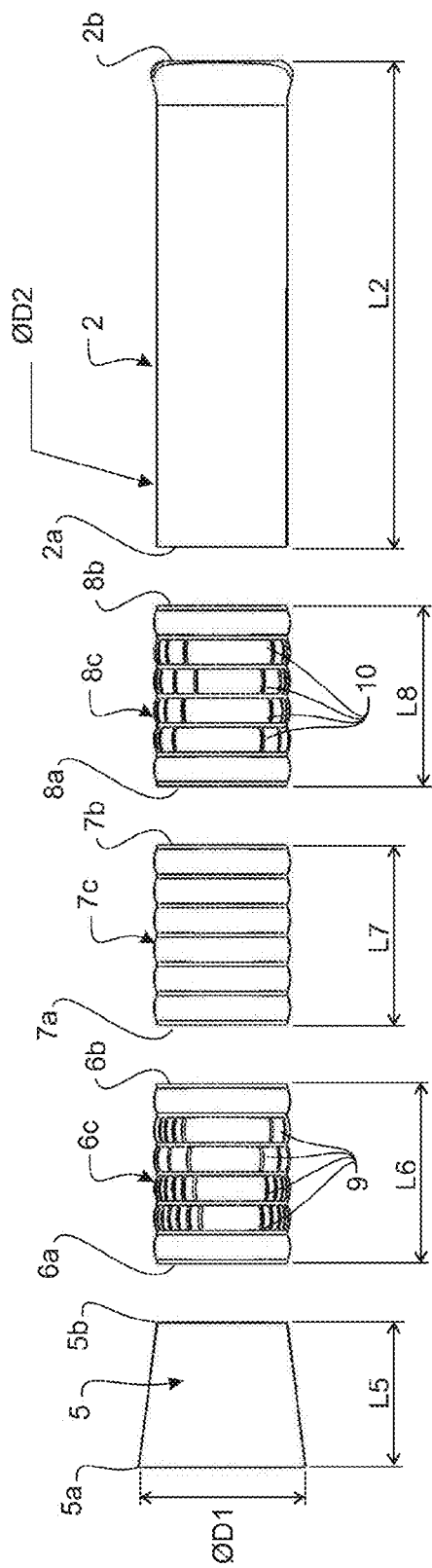
FIG. 4 is an exploded side view of the apparatus of FIGS. 1 to 3.

The entry cone 5, lengthener modules 6, 7, 8, and the cod end 2 are preferably separable. This enables the apparatus to be customised by substituting, adding, or removing various lengthener modules to suit a particular application. FIGS. 3 and 4 show exemplary dimensions of the various sections 5, 6, 7, 8, 2 of the apparatus 1. FIG. 4 is an exploded view of the apparatus in FIGS. 1 to 2 showing the various sections 5, 6, 7, 8, 2 of the apparatus 1 separated. In one embodiment, the three lengthener modules 6, 7, 8 are dimensionally equivalent and each have a length L6, L7, L8 of about 2040 mm. The cod end 2, the lengthener modules 6, 7, 8, and the trailing end 5b of the entry cone have a diameter D2 of about 1460 mm. In the embodiment shown, the entry cone has a length L5 of 1637 mm and the diameter D1 of its leading end 5a, forming the mouth of the apparatus, is about 1870 mm. These dimensions are exemplary and may be modified depending on the use of the apparatus 1, or to increase capacity, for example. In an exemplary embodiment, the maximum diameter of the lengthener portion 3 and cod end 2 is limited by the width of the decks on the towing vessel and/or onboard equipment such as rollers or drums for handling of the apparatus 1.

In the embodiment shown, the leading and trailing lengthener modules 6, 8 are escapement modules comprising a plurality of openings 9, 10 in the respective module walls 6c, 8c. These openings 9, 10 form escapements 9, 10 through which water can pass from an interior of the apparatus 1 to an exterior of the apparatus, to cause a reduction in the water flow rate inside the apparatus from the leading end 3a of the elongate lengthener portion toward the trailing end of the cod end portion 2b when the apparatus 1 is towed in direction T through a body of water.

In the embodiment shown, the second lengthener module 7 is an extension module. The wall 7c of extension module 7 does not contain any escapements, so the flow rate into the leading end 7a of the extension module 7 will be substantially the same as the flow rate out of the trailing end 7b extension module 7 as the apparatus is towed through the water in direction T.

The substantial impermeablity of the walls 2c, 6c, 7c, 8c of the cod end portion 2 and lengthener modules to water is such that the ability of water to flow out through the cod end is much less than the ability of water to flow out the escapement module(s) 6, 8, and such that the ability of water to flow out through the walls 6c, 8c of the escapement portions is much less than the ability of water to flow out through the escapements 9, 10.

In one embodiment, the side walls 2c, 3c, 5c, 6c, 7c of the cod end, entry cone and lengthener modules comprise a flexible membrane 4. Preferably the side walls 2c, 3c, 5c, 6c, 7c comprise an impervious material such as PVC or ripstop PVC, sail-making fabric, woven nylon airbag fabric, polyester, or polyethylene. In some embodiments, woven custom modules may be used. In a preferred embodiment, each lengthener module and the cod end portion 2 is constructed from a rectangular blank by joining two opposite edges of the blank. The edges may be joined by stitching, a zipper, tying sides together, or any other suitable fastening means. The entry cone is similarly constructed, but from a blank that forms a frustoconical shape when assembled. A blank for forming the entry cone 5 is shown in FIG. 8, and in the detail view of FIG. 9.

Figure 5:
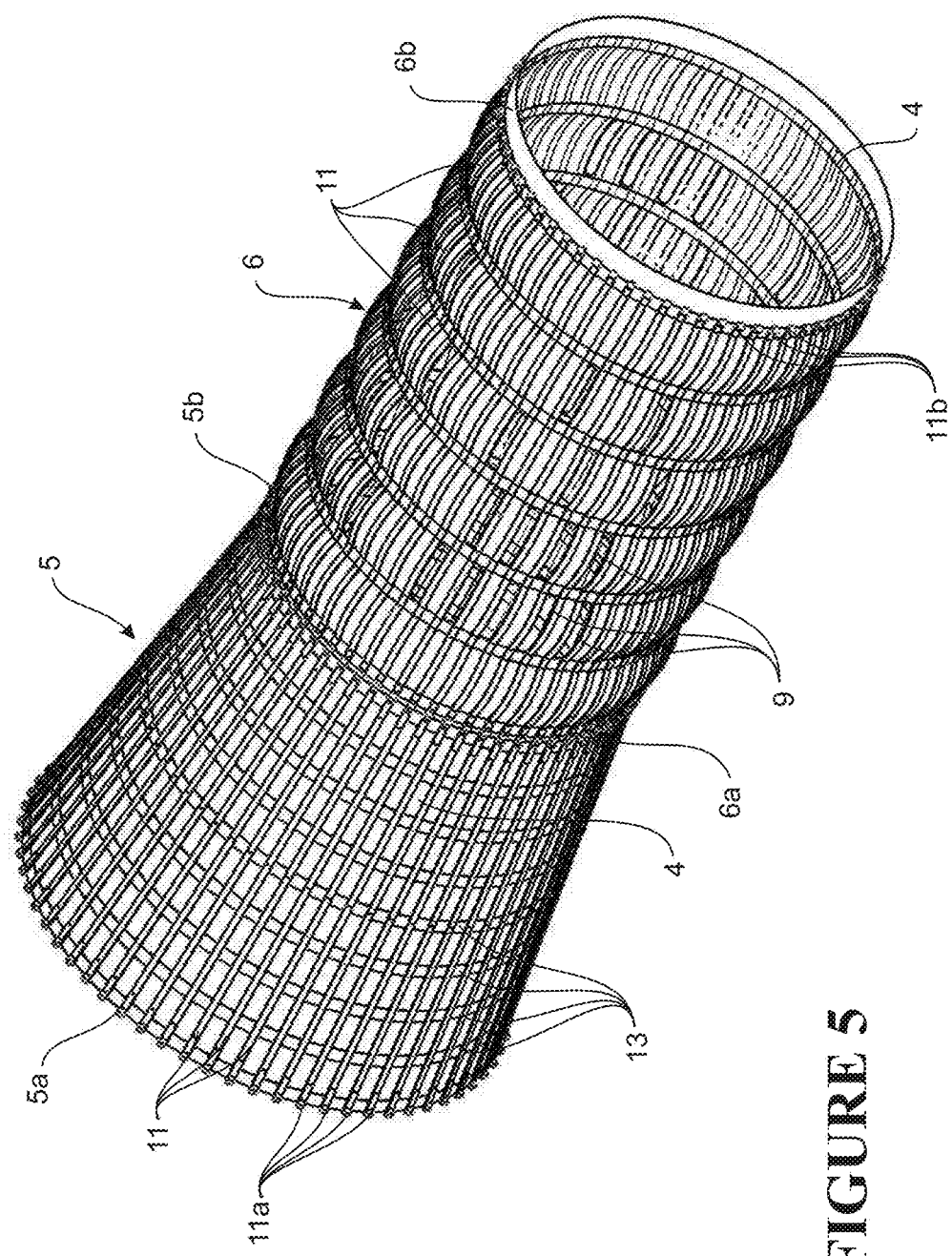
FIG. 5 is a partial perspective view showing the reinforcing on the entry cone and leading lengthener module in the apparatus of FIGS. 1 to 4.
Figure 6:
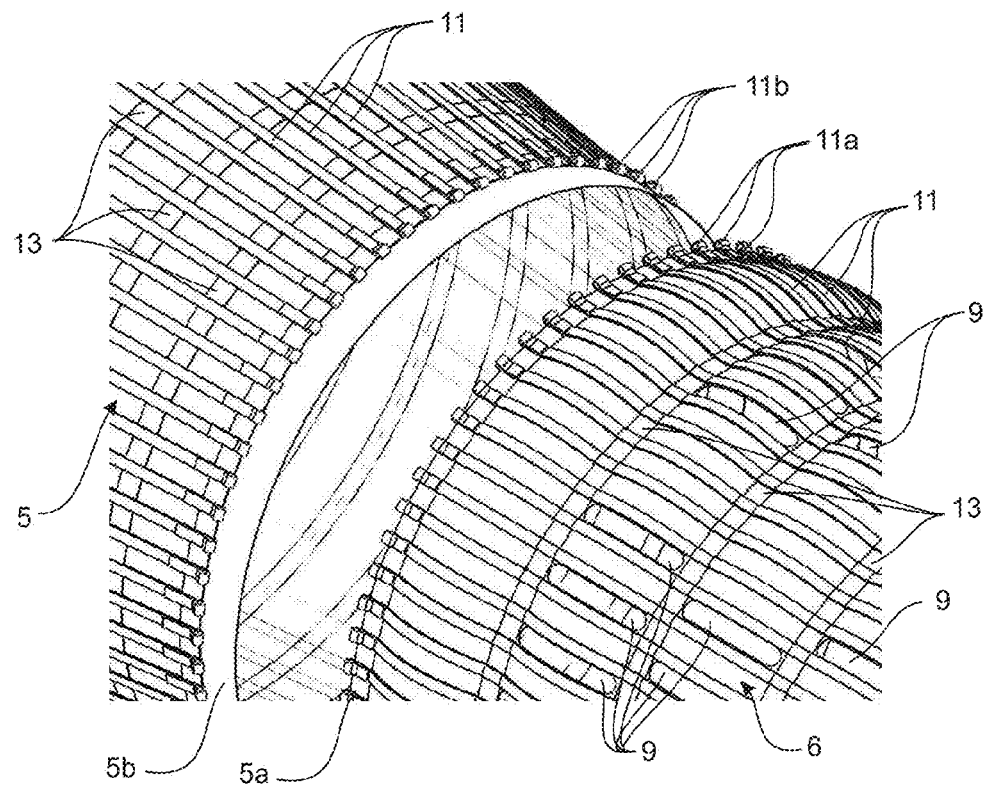
FIG. 6 is a partial exploded view showing the connecting loops on the reinforcing on the entry cone and leading lengthener module of FIG. 5.
Figure 7:
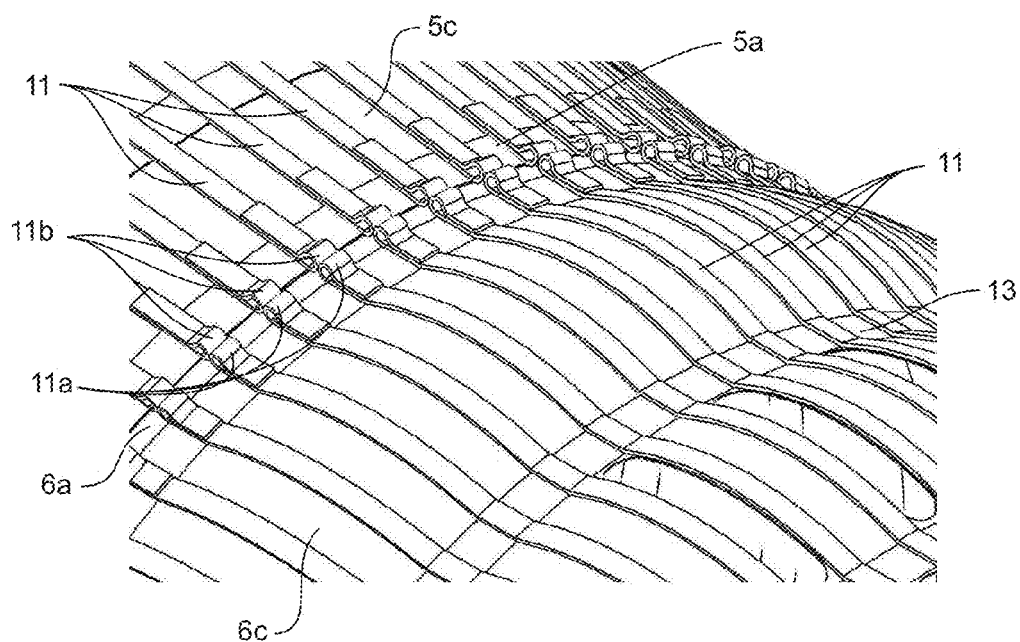
FIG. 7 is an enlarged partial perspective view showing the connection between the entry cone and leading lengthener module of FIGS. 6 and 5.

The entry cone 5, lengthener modules 6, 7, 8, and the cod end 2 comprise longitudinal and circumferential reinforcing components to strengthen the apparatus. FIGS. 5 to 7 show reinforcing in the form of reinforcing strips 11, 13 on the entry cone 5 and the first lengthener module 6. In that embodiment, the entry cone 5 comprises nine circumferential reinforcing strips 13 and a plurality of longitudinal reinforcing strips 11. The first lengthener module 6 comprises seven circumferential reinforcing strips 13 and a plurality of longitudinal reinforcing strips 11. The second and third lengthener modules 7, 8 and the cod end 2 are reinforced in a similar manner. The circumferential reinforcing strips 13 take the hoop stress of the inflated apparatus 1 as it is towed, and the longitudinal reinforcing strips 11 take up the tensile stress. The apparatus may additionally comprise a plurality of higher strength longitudinal strips as hauling strips (not shown). An exemplary embodiment comprises 3-4 hauling strips 12 rated to 6 tonnes each, arranged along the length of the lengthener portion 3 and cod end portion 2. These strips provide conventional hauling points for towing and handling the apparatus 1.

Figure 8:
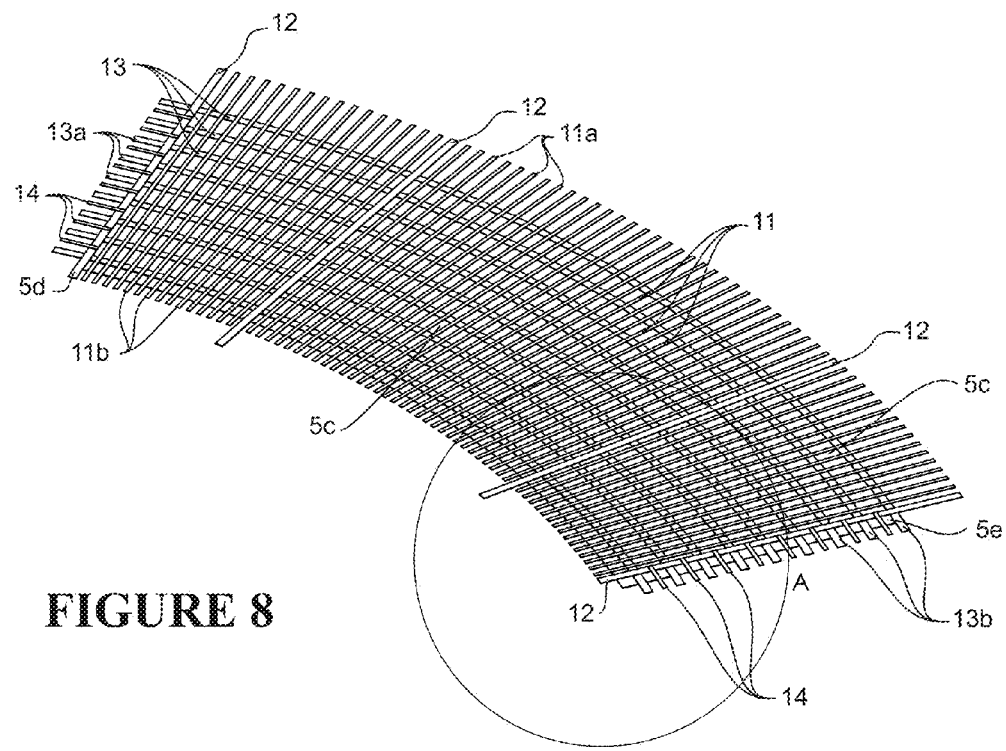
FIG. 8 shows a reinforced blank for forming the entry cone of the lengthener portion and for connecting to a lengthener module.
Figure 9:
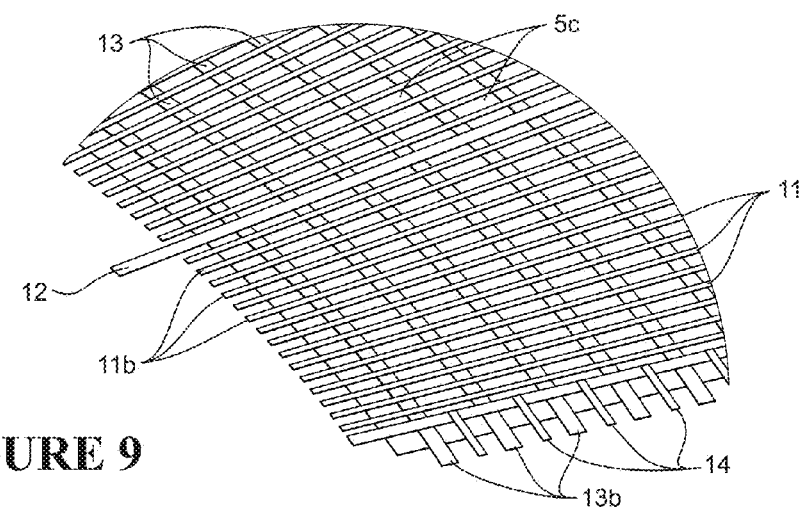
FIG. 9 is an enlargement of detail 9 in FIG. 8.

FIGS. 8 and 9 illustrate a blank for forming the entry cone module 5. The membrane wall 5c is reinforced on its external surface by transverse/circumferential reinforcing strips 13 and longitudinal reinforcing and haul strips 11, 12. The ends of the longitudinal strips 11b may be looped over to form loops for attaching an adjacent lengthener module as shown in FIGS. 6 and 7. The ends 13a, 13b of the transverse reinforcing strips 13a, 13b may similarly be looped over to form loops for stitching the two opposed side edges 5d, 5e together to form the entry cone 5. Additional loop members 14 may be provided for improving the stitched connection between the two sides 5d, 5e.

The cod end portion 2 is preferably reinforced to a greater extent than the lengthener portion 3 to accommodate the additional loading in the cod end portion as the apparatus is towed and retrieved. In an exemplary preferred embodiment, circumferential reinforcing strips 11 are spaced at 325 mm points along the length of the lengthener portion 3, and at 200 mm points along the cod end portion 2. The cod end portion 2 may preferably also comprise diagonal reinforcement members arranged on the external surface of the apparatus at an angle to both the circumferential and longitudinal strips 11, 13. Diagonal reinforcing around the cod end portion 2 helps to spread the load of lifting from the rear as described below, or while being hauled from the front of the cod end 2 itself.

In an exemplary embodiment, the reinforcing strips comprise 50 mm polyester seat belt webbing. Alternatively, the reinforcing strips may comprise other nylon and/or polyester webbing, PVC, Dynex, or Kevlar, or any flexible, strong and abrasion resistant material that can be formed into strips and attached via sewing or welding to the membrane. The reinforcing strips may be any suitable width.

The reinforcing strips 11, 13 are flexible and attached to the external surface of the membrane walls 4. Having the reinforcing positioned on the external surface of the membrane walls minimises contact of aquatic animals with the reinforcing, maintaining the smoothness of the internal surface and minimising abrasive damage to the captured animals. External reinforcing strips also protects the membrane wall 5c, 6c, 7c, 8c, 2c from abrasion against the sea floor during bottom trawling, and/or against the edge and deck of the towing vessel as it is hauled on board, In an exemplary embodiment, the reinforcing strips 11, 13 are stitched to the walls 5c, 6c, 7c, 8c, 2c of the apparatus. Depending of the material of the reinforcing strips 11, 13, the strips could be otherwise attached. For example, PVC reinforcing strips may be welded or glued to the external wall surfaces 5c, 6c, 7c, 8c, 2c.

Each end of each longitudinal strip 11 on the entry cone 5 and on the lengthener modules 6, 7, 8 comprises a loop portion 11a, 11b. The ends of the longitudinal strips at the leading end of the cod portion 2 also comprise loop portions. When the apparatus is assembled, the various sections 5, 6, 7, 8, 2 are arranged so that longitudinal reinforcing strips 11 on adjacent modules line up. Adjacent sections or modules are then connected by stitching the modules together with a chain stitch through the loops 11a, 11b. In alternative embodiments, adjacent sections may be connected using other fastening means such as zips, clips, adhesives, or different types of stitching. The type of fastening will depend on the end use and capacity of the apparatus. For example chain stitching generally provides a stronger connection than a zipper and would therefore be suitable for higher capacity applications.

The escapement modules 6, 8 each comprise a plurality of escapements 9, 10. The escapements 9, 10 comprise apertures that are sized, shaped and positioned to exploit anthropometric and behavioural characteristics of various aquatic animals to improve the selectivity of the apparatus 1. The escapements 9, 10 exploit such characteristics by way of their size, appearance to the animals, and by the flow rates and flow patterns they generate as the apparatus 1 is towed through the water.

Each escapement 9, 10 allows the passage of aquatic animals smaller than the aperture to exit from the interior of the apparatus to the exterior of the apparatus, through the escapement 9, 10. The escapements are preferably sized to allow the passage of young or undersized aquatic animals, or unwanted species, but prevent the passage of animals of a commercially usefully size.

Traditional netting strands are abrasive and often cause damage to escaping animals, for example by rubbing off scales. In addition, the abrasive and rigid nature of the tensioned strands in a traditional net means that animals are often not able to free themselves once they are caught, without suffering substantial damage. In contrast, the flexible and smooth impermeable membrane walls 4 in preferred embodiments of the present invention minimise abrasive damage to animals contacting the edges of the escapements 9, 10 as they exit the apparatus 1, and allow animals caught at the escapement to free themselves. For example, irregularly shaped animals such as gurnard that are close to an aperture size are able to waffle through the flexible escapements to free themselves with no or only minimal damage.

Figure 10:
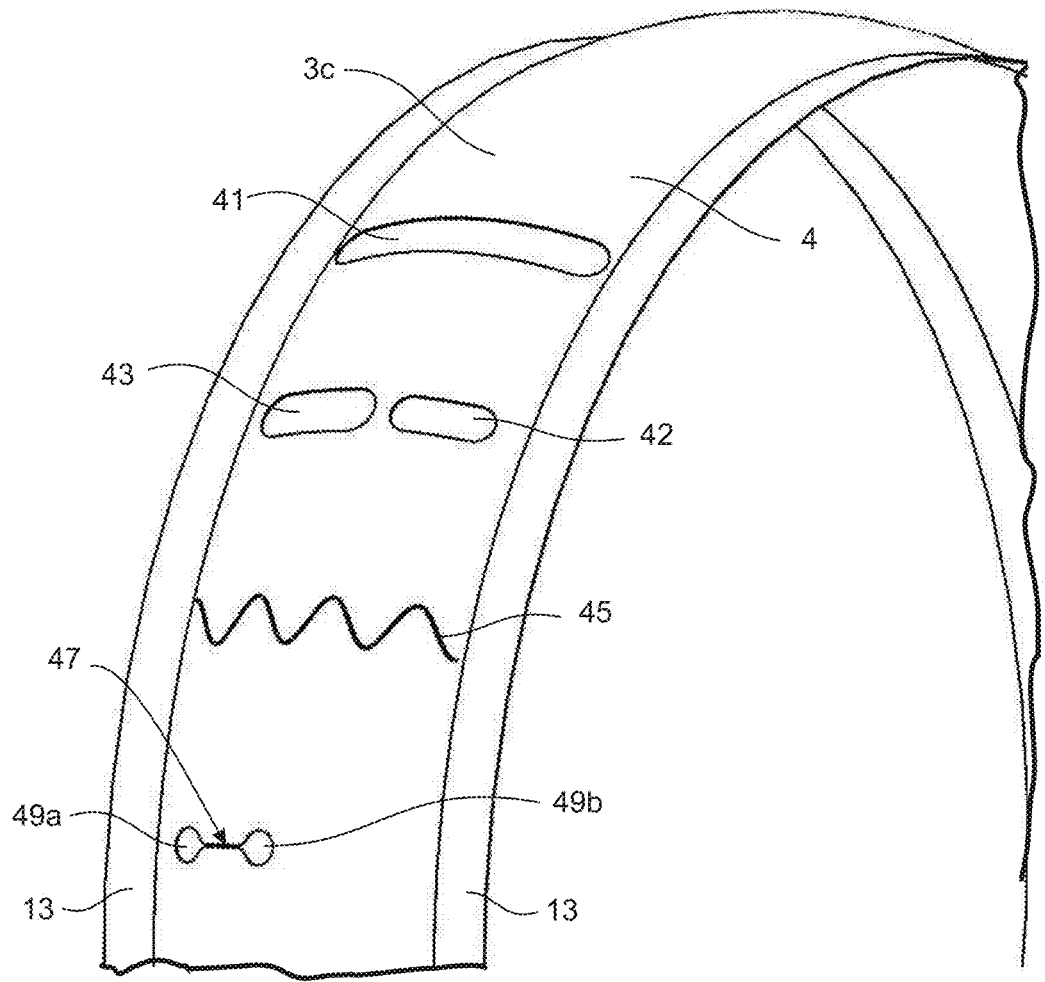
FIG. 10 is perspective view schematically showing various exemplary form escapements on a portion of an escapement module.

The escapements 9, 10 may comprise slits, slots, or other openings and may comprise straight and/or curved portions. FIG. 10 shows several possible exemplary escapements 41, 42, 43, 45, 47. The escapements 9, 41, 42, 43, 45, 47 are formed by cutting slits, slots, or other openings in a wall 3c, 6c, 8c of an escapement module 6, 8. Any one or more escapement modules may comprise a plurality of escapements of different sizes and/or different type. Alternatively any one or more escapement modules may comprise a plurality of identical escapements. Because the walls comprise a flexible membrane, the modules are very easy to customise and escapements can be easily shaped, sized and positioned as desired.

Escapements 41, 42, and 43 shown in FIG. 10 are examples of slot-type escapements. Escapement 45 is an exemplary sinuous slit-type escapement, and escapement 47 is a straight slit-type escapement.

When the escapements are formed by slits 45, 47 in the walls 3c, 6c, 8c of the escapement modules, the slits may comprise anti-tear apertures 49a, 49b at the ends of the slits. Alternatively, the ends of the slits may be otherwise reinforced, for example by stitching. In some embodiments, reinforcing may not be necessary, for example where the walls comprise a rip-stop material, or where the ends of the slits 45 coincide with the circumferential or longitudinal reinforcing strips 11, 13.

Figure 11:
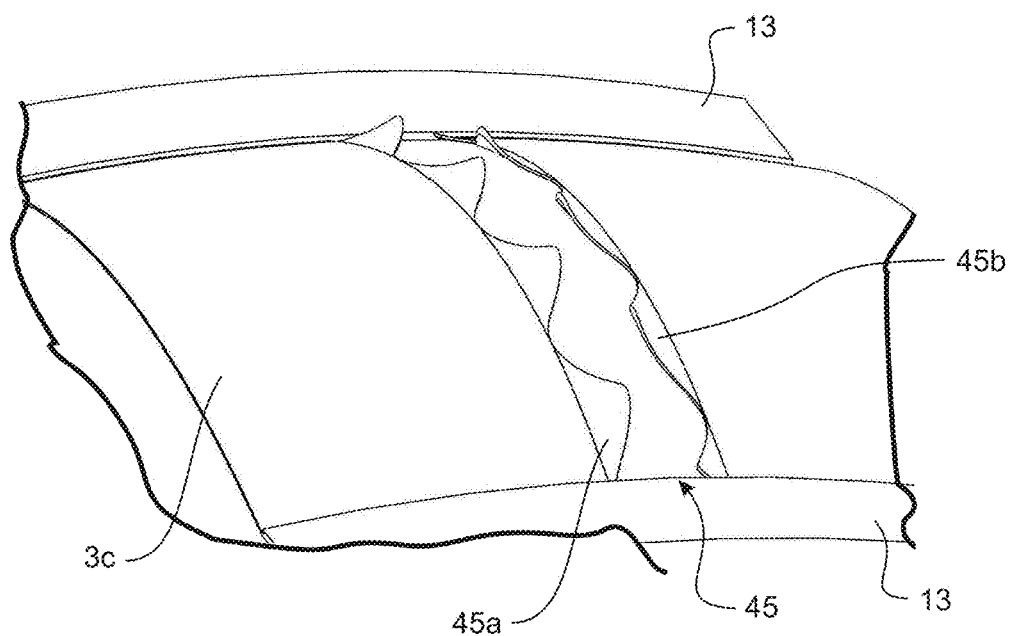
FIG. 11 is a partial perspective view showing a sinuous slit escapement open during use, as a result of the internal pressure in the apparatus.
Figure 12:
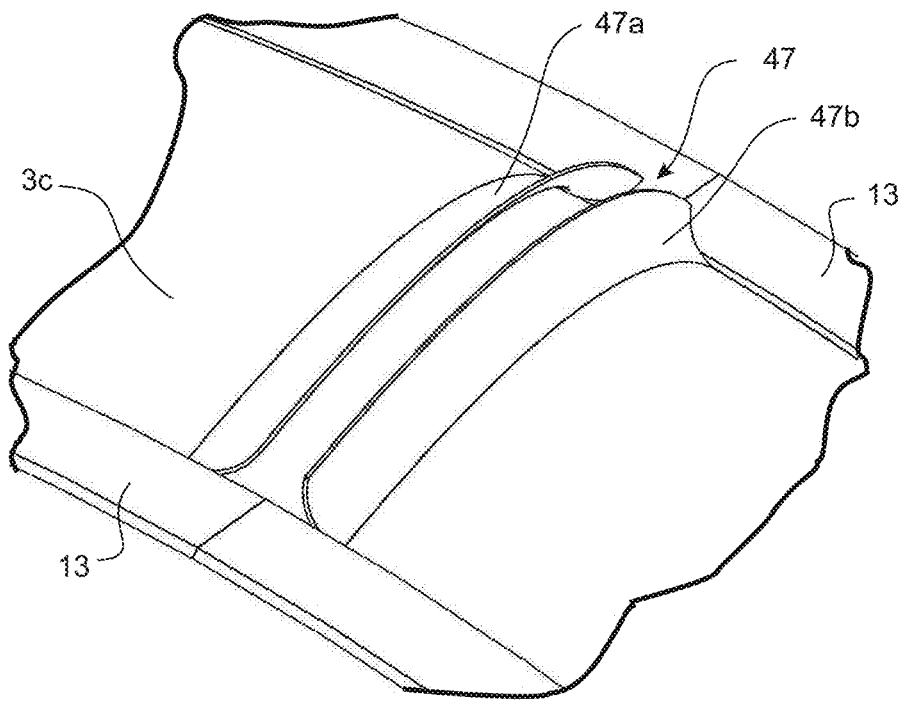
FIG. 12 is a partial perspective view showing a straight slit escapement open during use, as a result of the internal pressure in the apparatus.

Slits transform to form escapement 'slots' when the apparatus is inflated, as shown in FIGS. 11 and 12. The walls 45a, 45b, 47a, 47b on either side of a slit 45, 47 form flaps or 'fingers' that open under the internal pressure in the apparatus. The width of the 'slot' is determined by the amplitude of the curve or of the 'fingers' or 'flaps'. The degree to which the flaps open is a function of the internal pressure in the apparatus, which in turn is a function of the tow speed. Therefore slit-type escapements 45, 47 are reactive to the water flow and are more open at higher tow speeds. The escapement appears to disappear when the flow rate and pressure drop and the flaps 45a, 45b, 47a, 47b close.

Curved slots 47 open more readily than straight slots 45 in use when the walls are bowing or bulging out under the internal pressure in the apparatus. Slits with a low degree of curvature or smaller cord length are more 'rigid' and don't open as much under higher pressures. The shape of the slits, for example the amplitude of a sinuous slit, may be selected to increase the sensitivity of the escapement 'openness' to tow speed. This variable opening may be beneficial in inflating the apparatus, especially at low tow speeds. Escapements that close at low tow speeds also are advantageous during retrieval of the apparatus at the end of a tow, when the apertures close to provide a physical and visual barrier to prevent captured animals escaping.

The escapements 9 are positioned in discrete regions in the side walls 6c, 8c of the respective modules 6, 8. In the embodiment shown in FIGS. 1 to 3, the escapements 9, 10 are provided in a top region and in a lower region of the escapement modules 6, 8, and the sides are free of escapements.

Figure 21:
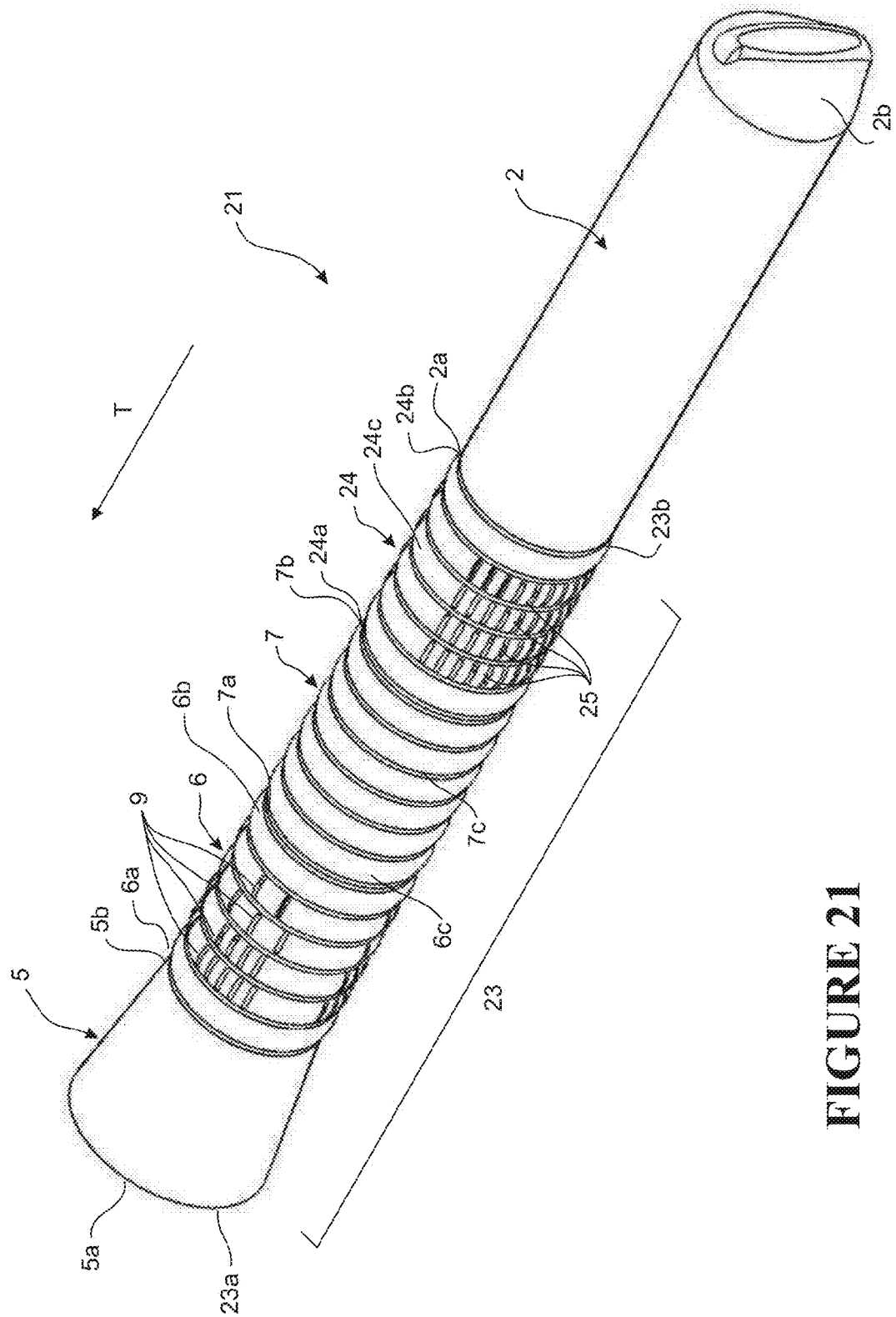
FIG. 21 is a rear overhead perspective view of an apparatus in accordance with a second embodiment of the present invention.

FIG. 21 illustrates an apparatus 21 for harvesting aquatic animals in accordance with a second exemplary embodiment of the invention. The apparatus 21 is configured with an elongate lengthener portion 23 comprising an entry cone 5 and three lengthener modules 6, 7, 24 connected in series; and a cod end portion 2. The open trailing end 23b of the lengthener portion is operatively connected to the open leading end 2a of the cod end portion 2, and the open leading end 3a of the lengthener portion 23 forms an open mouth of the apparatus.

The cod end portion 2, entry cone 5, first lengthener portion 6, and extension module 7 in the embodiment of FIG. 21 are as described above in relation to the first embodiment shown in FIGS. 1 to 4. In the embodiment of FIG. 21, the second escapement module 24 has been substituted for the second escapement module 8.

The second escapement module 24 comprises an open leading end 24a operatively connected to the trailing end of the extension module 7, and an open trailing end 24b that forms the trailing end of the lengthener portion 23b and is operably connected to the leading end of the cod end portion 2. The escapement module 24 further comprises a plurality of openings 25, which form escapements through which water can pass from an interior of the apparatus 21 to an exterior of the apparatus 21 to cause a reduction in the water flow rate inside the apparatus from the leading end 24a of the second escapement portion toward the trailing end of the second escapement portion 23b when the apparatus 21 is towed in direction T through a body of water.

The side wall(s) 24c of the second escapement module 23 comprise a flexible membrane that is substantially impervious to water. The escapements 25 are provided in port and starboard regions of the membrane 23c, rather than in upper and lower regions of the module as in the second escapement module 8 in FIGS. 1 to 4.

The escapements 9, 10, 24 may be positioned to exploit behavioural characteristics of fish to aid in selection. This may be achieved placing the escapements in areas that unwanted species are likely to be more attracted to, and/or by creating desired flow patterns in the apparatus to encourage different species towards or away from the escapements 9, 10, 24.

By way of example, in the embodiment of FIGS. 1 to 7, the escapements 9, 10 are positioned in upper and lower regions of the escapement modules 6, 8. The side regions of the escapement modules are substantially impermeable. In this example, pelagic species such as barracouta, dogfish and hoki will want to swim upwards and will escape thought the escapements 9, 10, but surface aversive species such as snapper, groper, trevally and alfonsino will swim away from the escapements 9, 10 and be captured. Benthic fish such as gurnard and flatfish may prefer to escape through the lower escapements 9, 10; however, surface preferring fish may also be gently recirculated by the flow in the apparatus 1 into the proximity of the upper escapements and escape through the upper escapements. The lower escapements also provide lift for the apparatus to prevent the apparatus dragging on the seabed when bottom trawling.

In the embodiment of FIG. 21, the escapements 9 in the first escapement module 6 are positioned in upper and lower regions, and the escapements 25 in the second escapement module 24 are symmetrically positioned in side regions. Such a configuration could be used could be used to increase the retention of pelagic, surface-seeking fish such as barracouta, as there are no escapements in the upper region of the apparatus where they are likely to swim.

Alternatively, the escapements may be positioned in different regions or walls of the escapement modules, depending on the desired application. Alternatively, one or more escapement modules may comprise escapements evenly positioned around the module.

The appearance of the escapements may also be modified to make the escapements more or less attractive to different species. For example in escapements 45, 47 formed by slits, the sides of the slits form 'flaps' 45a, 45b, 47a, 47b that fold outwards under internal pressure in the apparatus 1 and the loose edges of the flaps give apparent depth to the escapements and make the escapements appear smaller than their actual size. The flaps also move as the apparatus is towed. This apparent depth and the moving flaps deter many species. The apparent 'depth' of the escapements may therefore be altered by changing the size of the flaps. The smaller appearance of the escapements provides the advantage of deterring animals that may not easily pass through the escapement, and the flaps 45a, 45b, 47a, 47b are able to yield to allow fish larger than the apparent escapement through.

An alternative exemplary embodiment comprises elongate, longitudinal 'spaghetti' escapements in the first escapement module 6. These long escapements are avoided by surface aversive fish such as hapuka but appear open to sharks. Long escapements can also provide low damage 'overflow' zones in case of over filling of the apparatus 1 with animals.

The escapement regions may also be coloured to attract or detract certain fish species. For example, the impervious or closely woven construction of the module membranes of the preferred form apparatuses allows light intensity and colour to be used to further improve selection. The membranes may be opaque, multi-coloured, or transparent/translucent. Species such as barracouta are strongly attracted to transparent and translucent zones allowing them to be directed toward or away from escapements or towards specific zones within the preferred form apparatuses.

The number of escapements will be a function of the size and shape of the escapements in each escapement lengthener module 6, 8, and the size of the swept intake area on the entry cone 5, D1. Preferably the total, open area of the escapements when the bag is fully inflated is less than about 60% of the intake area of the leading end 5a of the entry cone 5, and more preferably is about 55 to about 60%. An escapement area that is too high compared to the swept entry cone area will provide difficulties inflating the apparatus. An escapement area that is too low will result in a large bow wave in front of the cone which will force animals through any attached netting. An open escapement area between about 55% and about 60% of the swept entry cone area generally ensures reliable inflation of the structure, minimal bow wave in front of the cone and good transport of the animals into the low velocity and escapement areas 9, 10.

The wall angle of the entry cone 2 may be selected depending on the intended trawl speed, surface to volume ratio of the apparatus 1, the number and type of escapements 9, 10, and to be compatible with onboard equipment. For example, slit type escapements that open under pressure will dynamically change their apertures depending on the tow speed. If the escapement ratio to swept area is designed for a specific towing velocity range, the escapements will open under pressure to the appropriate size. At low tow speeds the constricted aperture will provide some resistance to flow and assist inflation of the apparatus. The total open area of the escapements 9, 10 when the apparatus is inflated in use is much smaller than the open area of traditional trawl nets. For example, in a traditional net, the open area or porosity of the net may be between about 50% and 70%. In the apparatus shown in FIGS. 1 to 7, the total area of the escapements is only about 3% of the total wall area of the lengthener portion 3.

Large areas of small escapements may require compensation for added resistance.

To assemble the apparatus shown in the Figures, the entry cone 5, lengthener modules 6, 7, 8, and the cod end portion 2 are provided as separate blanks. Each blank is individually assembled as described above—by connecting opposing sides along a longitudinal seam, and in the case of the cod end portion, sealing the trailing end 2b. The modules 6, 7, 8 are then arranged in series between the entry cone 5 and the cod end portion 2. The modules 6, 7, 8 may be arranged in any desired order. In alternative embodiments, additional escapement modules or lengthener modules may be added, or substituted for the modules shown such that the apparatus may be configured to suit the desired application, such as to achieve desired selectivity of species capture, or greater capture capacity, for example. In alternative embodiments, fewer escapement modules may be provided.

Adjacent sections 5, 6, 7, 8, 2 are then connected using any suitable fastening means, preferably by stitching the reinforcing strips in adjacent modules together, for example using a chain stitch. After the apparatus has been assembled, the apparatus may be readily modified to customise it for a different application or fishery, by disassembling one or more of the inter-section connections and adding and/or removing modules as required. The modular nature of the device enables easy tailoring of the device for different applications.

The apparatus may sized to provide a much larger volume within the apparatus than conventional mesh cod ends, which further reduces animal to animal, animal to surface, and animal to debris contact.

Use of the Apparatus

FIG. 13 schematically shows the apparatus 1 towed behind a marine vessel 51. Apparatus 21 would be towed in a similar manner. The leading end 3a of the apparatus 1 is operatively connected to sweep wings 63, and the sweep wings are connected to a towing vessel 51 such as a boat by cables 61. In a first step, the apparatus 1 is allowed to roll off the back of the boat 51, and is submerged in a body of water, for example in the sea, and towed through the water by the vessel 51.

Water enters through the mouth 3a of the apparatus 1 and the internal pressure created in the apparatus by the relative water flow toward the trailing end of the apparatus and the largely impermeable walls causes the apparatus 1 to expand to the inflated configuration. The tapered walls 5c of the entry cone 5 assist with inflating the apparatus 1. As the apparatus 1 is towed, aquatic animals enter the inflated apparatus through the mouth 3a. If the animals do not exit via the escapements 9, 10, they move to the cod end portion 2.

Figure 14:
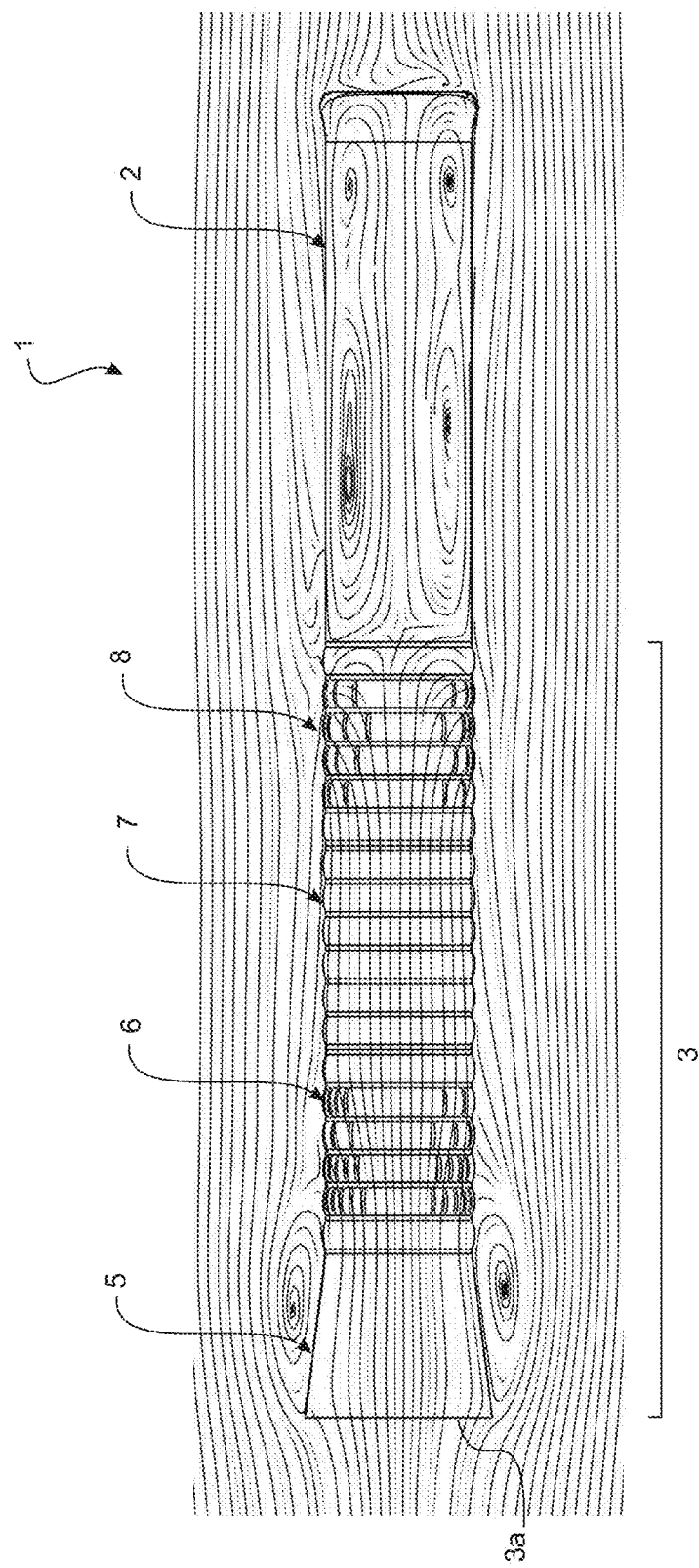
FIG. 14 is a port side view of the apparatus of FIGS. 1 to 3 with streamlines to illustrate flow patterns in a vertical plane within and around the apparatus in use.
Figure 15:
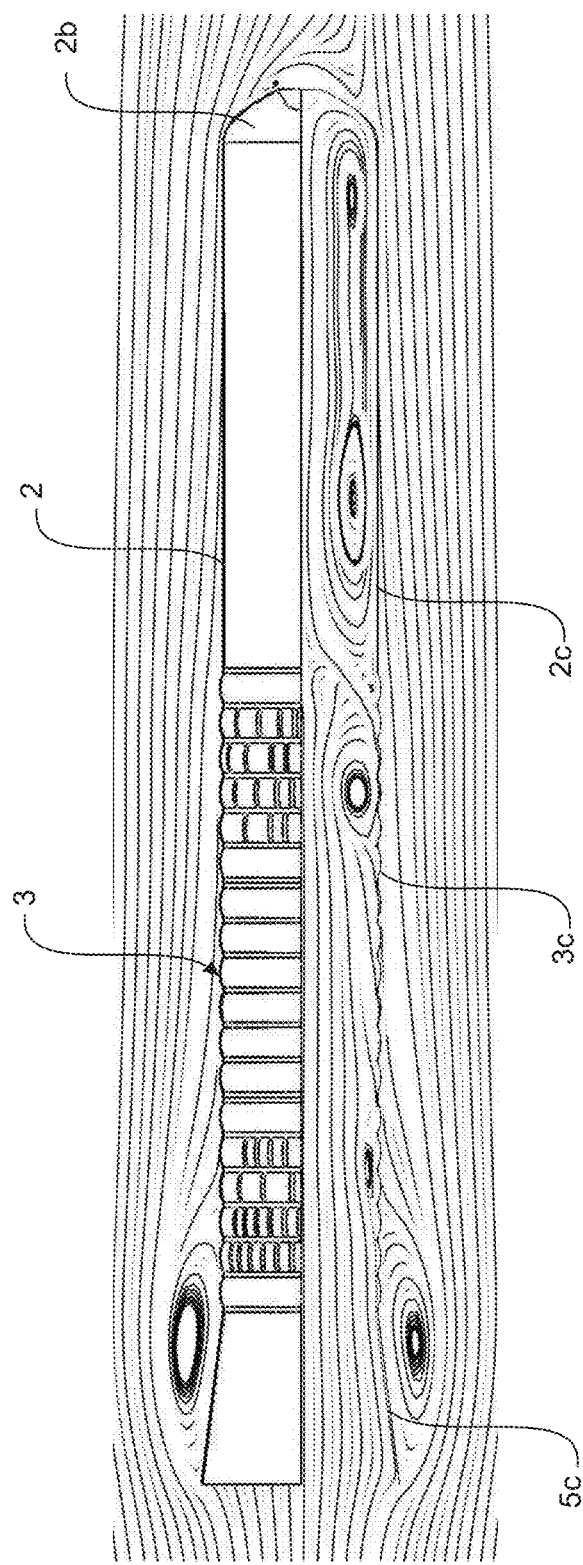
FIG. 15 is a top cutaway view of the apparatus of FIGS. 1 and B with the port half of the apparatus cut away and streamlines to illustrate flow patterns in a horizontal plane within the port half of the apparatus and around the apparatus in use.
Figure 16:
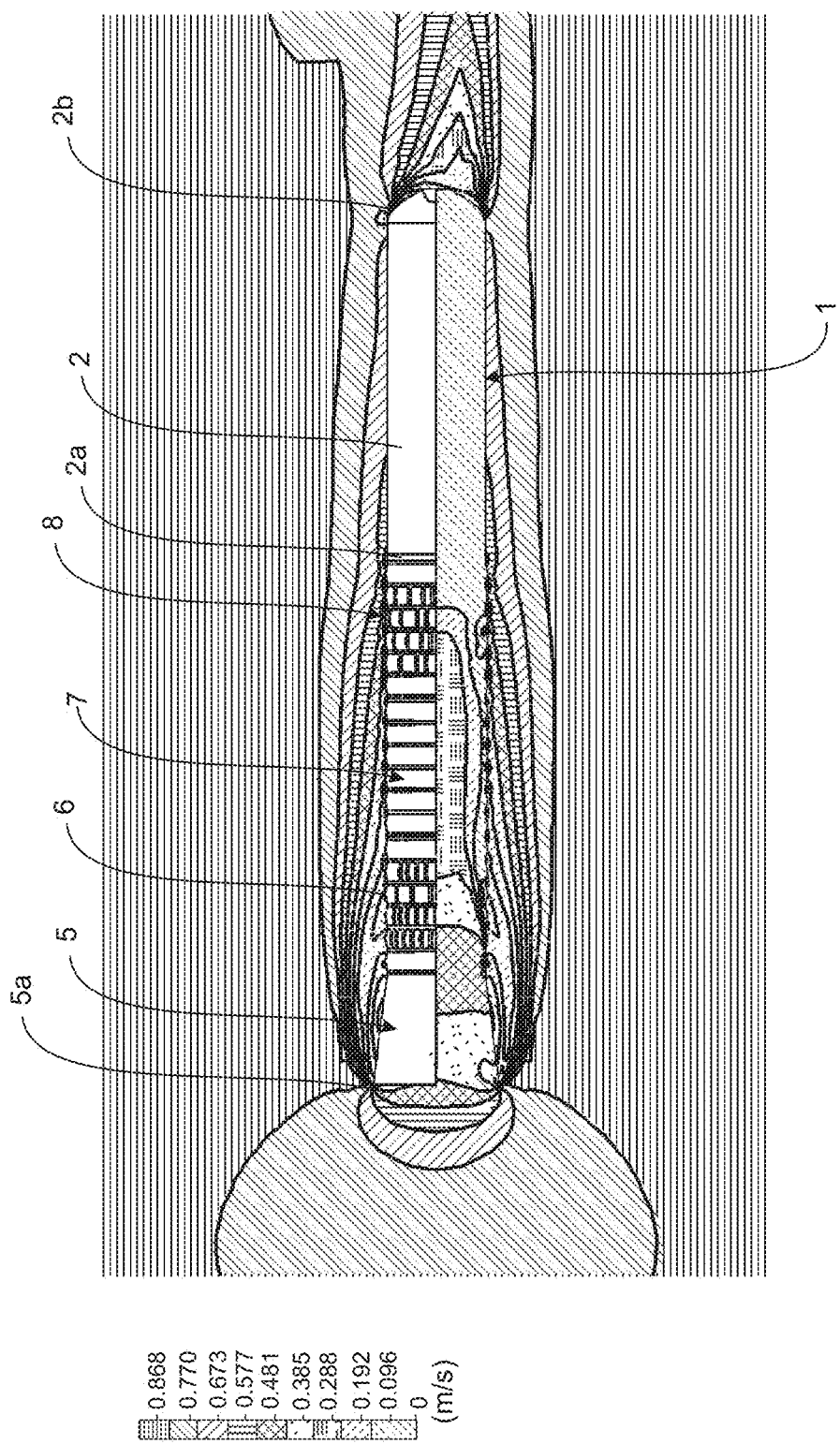
FIG. 16 is a port side view of the apparatus of FIGS. 1 to 3 *with* contour lines to illustrate areas of different flow velocities within and around the apparatus in use.
Figure 17:
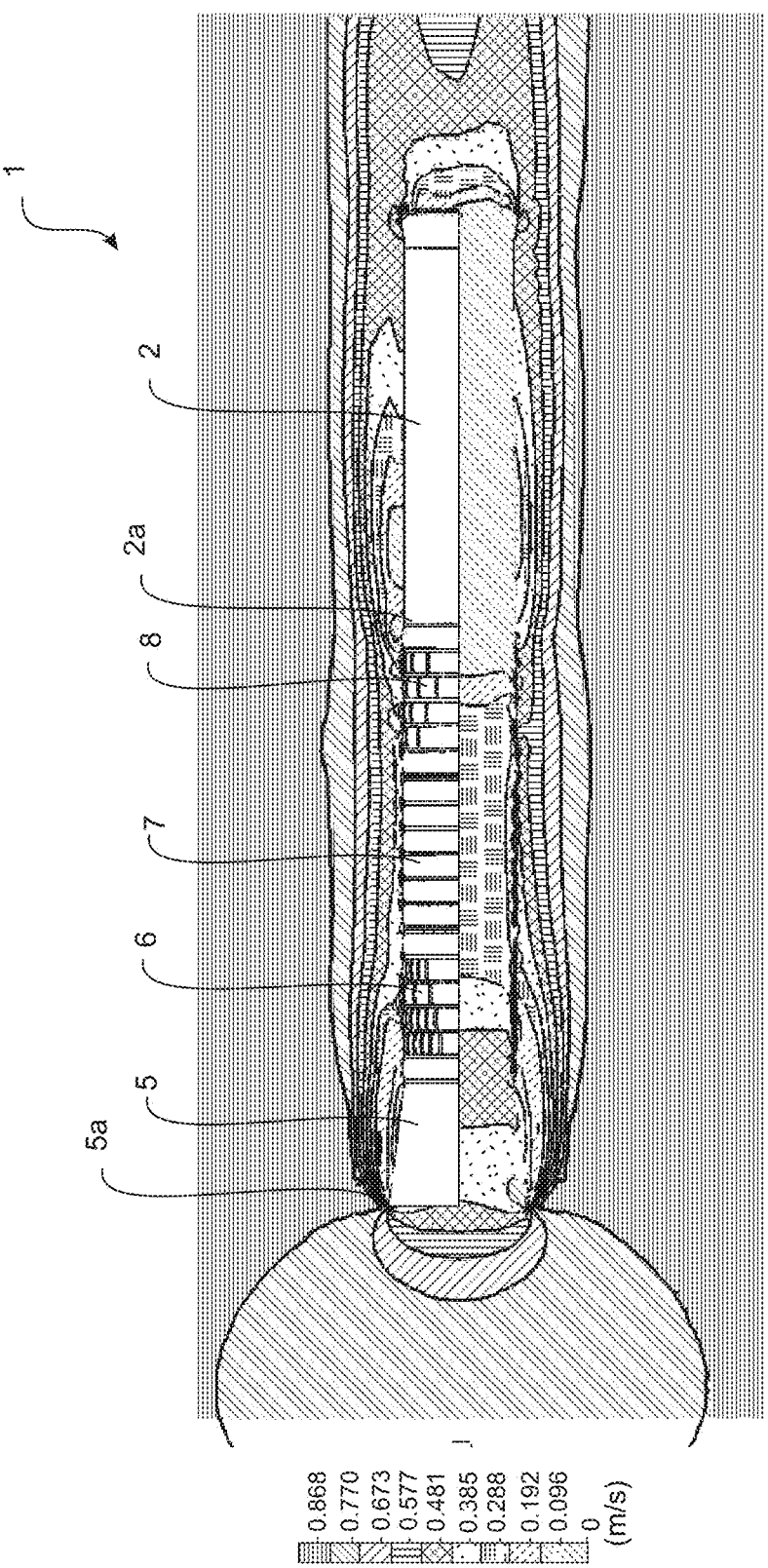
FIG. 17 is a top cutaway view of the apparatus of FIGS. 1 to 3 with the port half of the apparatus cut away and contour lines to illustrate areas of different flow velocities within the port half of the apparatus and around the apparatus in use.
Figure 19:
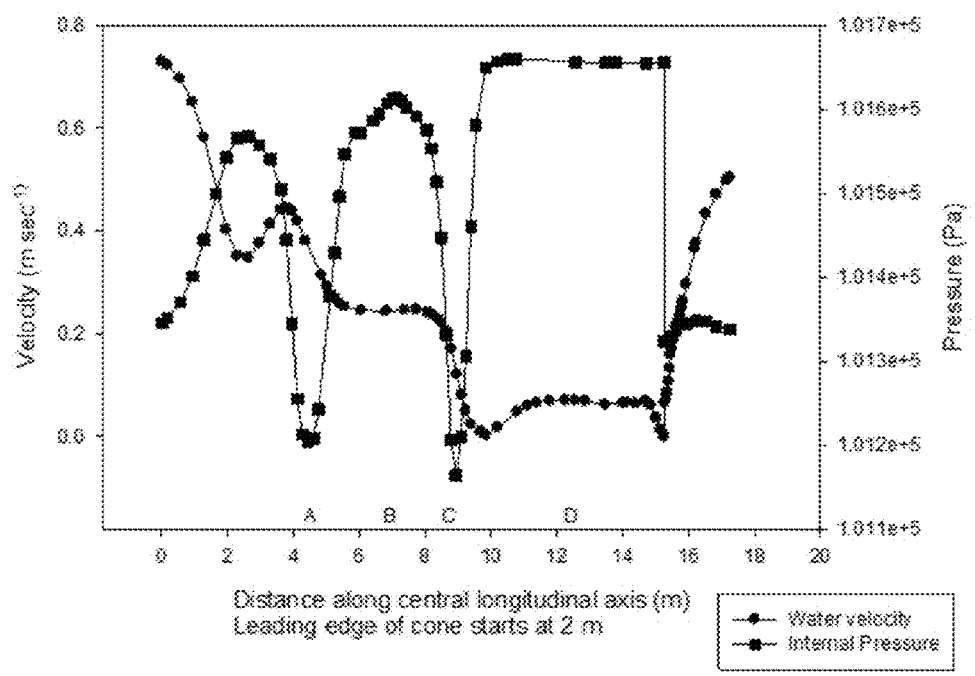
FIG. 19 is a graph showing flow velocity and internal pressure along the central longitudinal axis for the apparatus shown in FIGS. 1 to 18(*iv*), towed through the water at 3 knots (1.544 $ms^{-1}$) from a point 2 m in front of the entry mouth of the apparatus.
Figure 20:
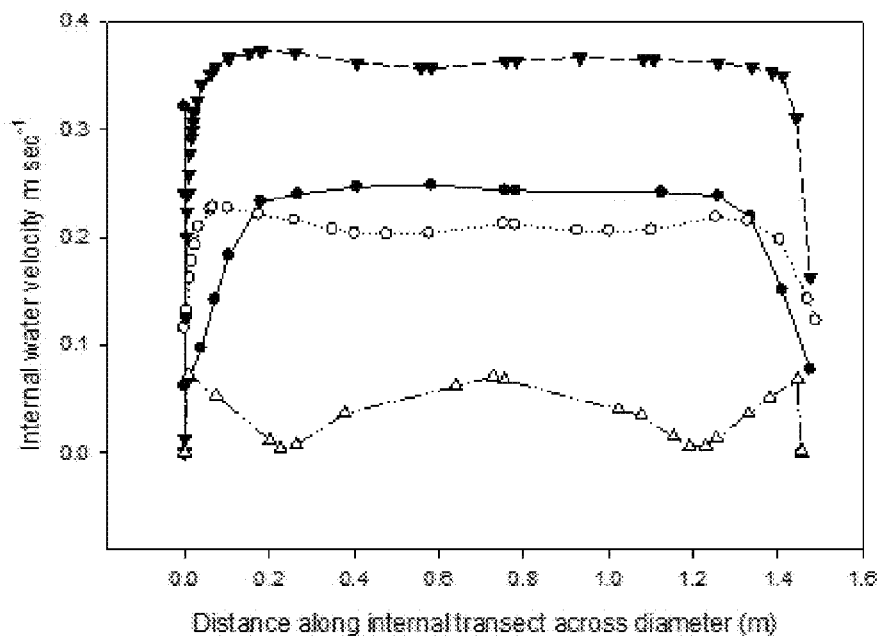
FIG. 20 is a graph showing internal flow velocity across the diameter of the apparatus shown in FIGS. 1 to 18(*iv*) towed through the water at 3 knots (1.544 $ms^{-1}$) at various points along the apparatus; the line shown with solid triangles is taken through plane A-A shown in FIG. 3, along a vertical transect; the line with solid circles is taken through plane C-C shown in FIG. 3, along a horizontal transect; the line with hollow circles is taken through plane C-C shown in FIG. 3, along a vertical transect; and the line with hollow triangles is taken through plane D-D shown in FIG. 3.

As the apparatus 1 is towed, water flows relative to the apparatus in through the mouth 3a in the longitudinal direction of the apparatus. There is water flow out of the apparatus 1 through the escapements 9, 10 in each escapement module 6, 8, so that the flow rate of water inside the apparatus 1 generally reduces from the leading end 3a of the elongate lengthener portion 3 toward the cod end portion 2. Preferably, the water flow rate progressively slows in a series of controlled, graded steps occurring at each escapement module 6, 8, to the cod end portion 2, to provide a plurality of zones with different flow rates. These steps can be tailored to the physical and behavioural requirements of the target animals and depending on the fishing operation. FIGS. 14 and 15 show streamlines showing water flow patterns and FIGS. 16 and 17 show computational models for the fluid dynamics in the apparatus 1 of FIGS. 1 to 15 when it is being towed at 3 knots ($1.544$ ms$^{-1}$) FIG. 19 is a graph showing internal pressure and water velocity relative to the apparatus 1 along its central axis. The models show the general decrease in flow rate from the mouth 3a to the cod end portion 2.

The graph in FIG. 19 shows that at the leading end 3a of the apparatus 1, the flow velocity along the central axis CA increases along the entrance cone 5 as the cone narrows from the mouth 5a to the trailing edge 5b adjoining the leading lengthener module 6. The flow rate then decreases significantly along the first escapement module 6 as water escapes through the escapements 9 in that module.

The flow rate in the apparatus is relatively constant and laminar or less turbulent along the extension module 7. The extension module provides a low-turbulence region for captured animals to be contained in medium velocity flowing water during harvesting. A longer medium velocity region may be provided by using a longer extension module 7, or a plurality of adjacent extension modules to increase the capacity of the apparatus for high volume fisheries. Alternatively, to increase capacity, additional length may be added to the apparatus in the form of further blank extension modules, and/or longer blank, escapement-free portions in the escapement modules 6, 8, at any point along the lengthener portion trailing the first region of escapements 9.

The flow rate then decreases again across the escapements 10 in the second escapement module 8 as more water escapes through the escapements 10 in that module. In preferred embodiments, the total area of the escapements 9 in the leading escapement module 6 is larger than the total open area of the escapements in the trailing escapement module 8, so the decrease in flow rate is greater at the first escapement module 6 than at the second escapement module 8. By way of example only, in one embodiment the ratio of the area of substantially impervious membrane to escapements in the leading escapement module 6 is about 93.5%, and the corresponding ratio in the trailing escapement module 8 is about 92.3%. In another embodiment, the difference could be greater. The escapements 9 in the first escapement module 6 may be larger than the escapements 10 in the second escapement module 8 to allow larger unwanted species to escape at the forward, higher velocity region of the apparatus 1.

Finally, the lowest velocity flow is in the cod end portion 2. Preferably, the apparatus is configured such that when the apparatus is towed through a body of water, the water velocity in the cod end portion relative to the apparatus is less than about 10% of the relative water velocity outside the apparatus, and preferably less than about 5% of the relative water velocity outside the apparatus. As an example, for an external water velocity V of 2 metres per second, velocity $V_1$ in the cod end portion 2 is may be about 0.04 to 0.1 metres per second. That creates a very low turbulence refuge in the cod end portion, to provide a relaxed low flow rate environment for the aquatic animals. The apparatus 1 may be tailored to create lower or higher velocity flow in the cod end portion, as desired, by modifying design and placement of the escapements or escapement modules, and dimensions of the apparatus. Very low velocity flow is advantageous for low damage, low fatigue capture of easily exhausted species such as gurnard or John Dory, or capture of juveniles.

The low flow rate in the cod end portion 2 provides a low turbulence refuge for captured aquatic animals to swim in during the trawling process. This allows the aquatic animals to relax and minimises impacts between the aquatic animals and with the apparatus. The aquatic animals can readily swim along in the cod end portion 2 of the apparatus as it is towed through the body of water.

As shown in FIGS. 14 and 15, water circulates in the cod end portion 2. This low velocity circulation allows debris caught in the apparatus to be flushed out through the further forward escapements rather than catching against the back of the apparatus. For example, sand, shells, and stones may be flushed out and returned to the sea floor. As well as producing a cleaner catch, this reduces rough object contact with the captured animals. Crew labour onboard the vessel removing mud and sand from the catch and the apparatus is also reduced.

The number and size of the escapements 9, 10 in the escapement modules 6, 8 are selected to reduce the average flow velocity in the extension module 7 and/or the cod end 2, at a target tow speed, to well within the maximum sustained swimming speed (Ucrit) of the target organisms to be held in the respective segment. This prevents captured animals being exhausted and swept along by the water flow.

The membrane nature of the apparatus 1 allows the flow patterns within the apparatus to be adapted to specific selection tasks. A number of design elements can be modified to achieve specific selection and animal retention goals including escapement pattern, aperture configuration, module type, module numbers and size.

Figure 18I:
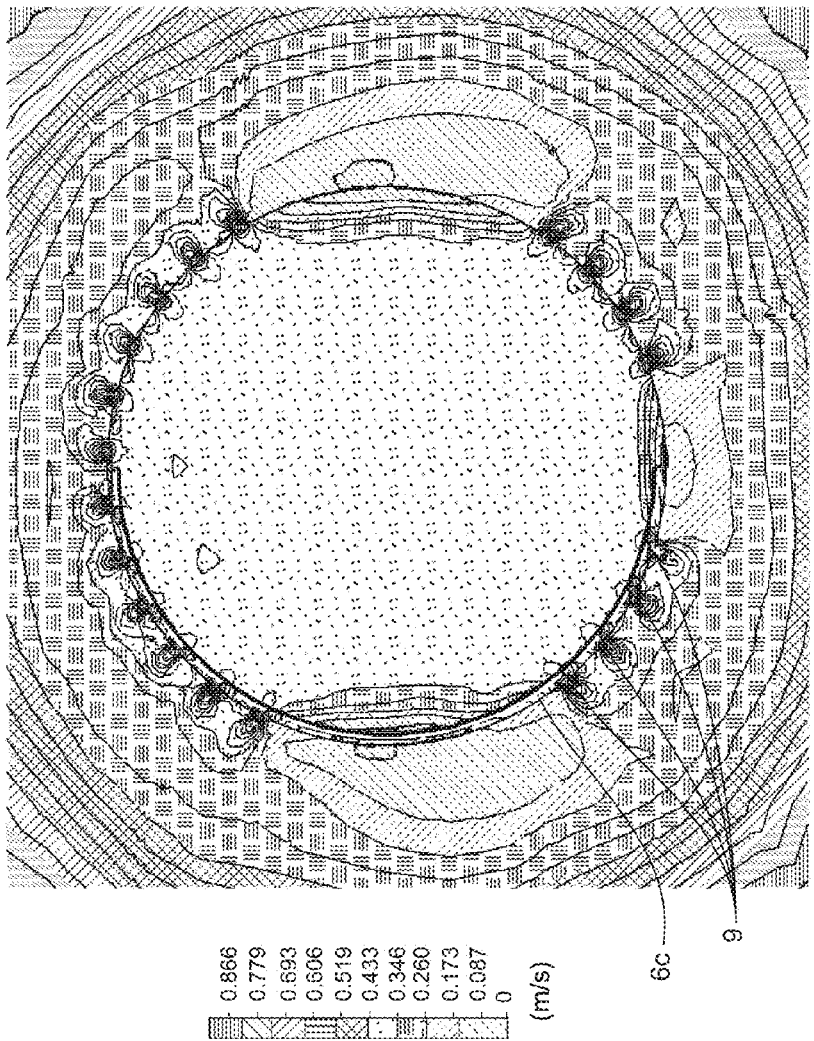
FIGS. 18(*i*) to 18(*iv*) are section views through the apparatus of FIGS. 1 to 3, with contour lines illustrating areas of different flow velocities within and around the apparatus in use.
Figure 18:
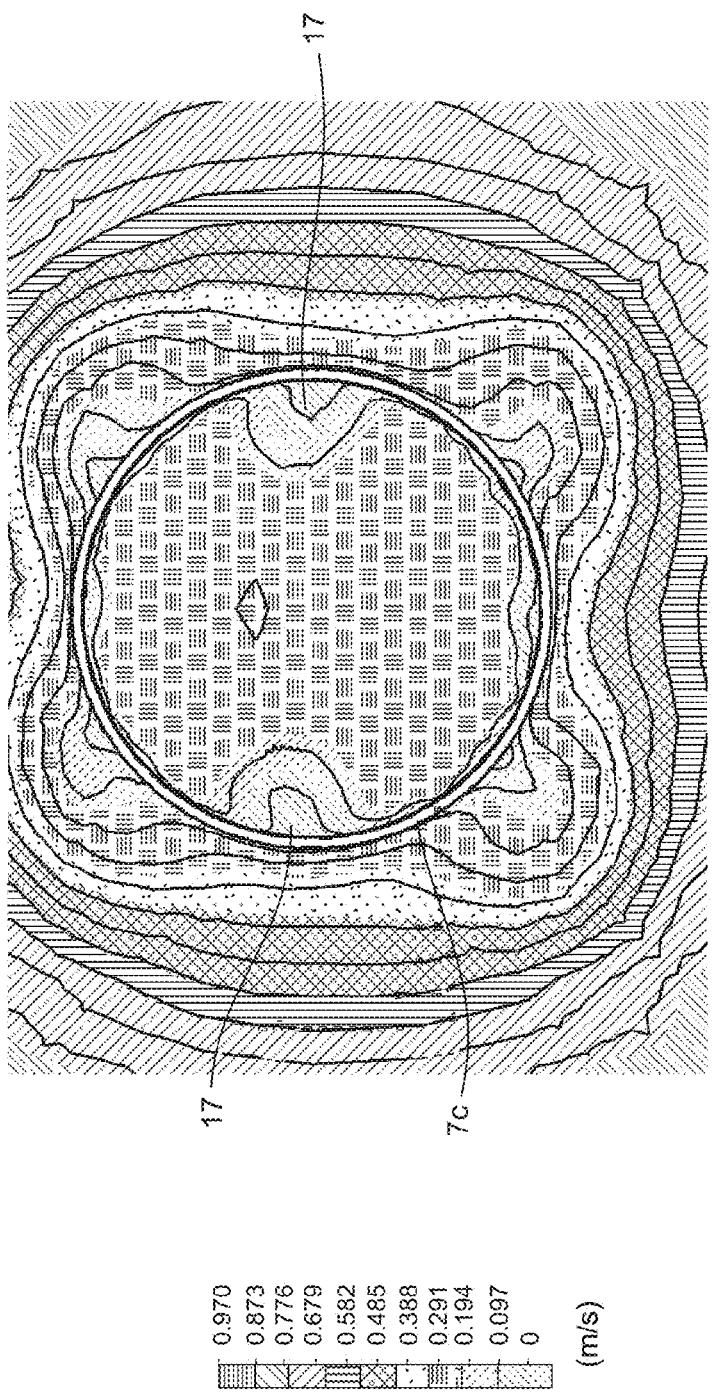
Figure 18:
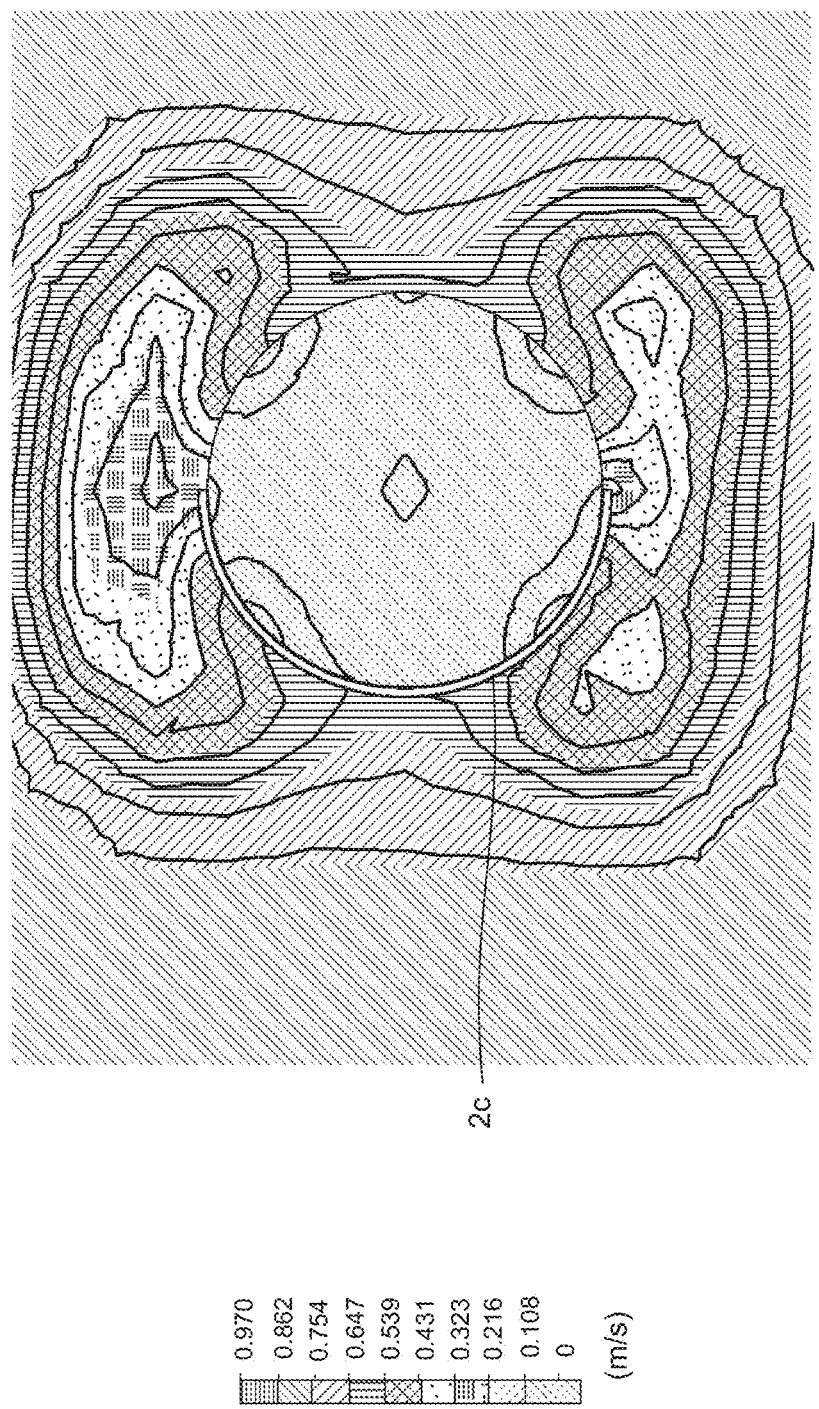

The average flow rate within the apparatus 1 is advantageously always less than the relative flow outside the apparatus. However the flow at any given point along the apparatus 1 is not consistent across the cross section of the apparatus. Instead, the flow comprises regions of low velocity flow and regions of higher velocity flow. FIGS. 18(*i*) to 18(*iv*) illustrate different flow velocities through each of the lengthener modules 6, 7, 8, and the cod end 2.

As illustrated in FIGS. 18(*i*) and 18(*iii*), flow in the escapement modules 6, 8, is directed towards the upper and lower escapements 9, 10 creating localised regions of high velocity flow 15 around each escapement 9, 10. Because the embodiment of FIGS. 1 to 4 does not comprise side escapements, a low velocity flow zone 17 or 'dead zone' is created along the sides of the escapement modules 6, 8. Flow in this zone has a reduced longitudinal velocity component, but may comprise an increased radial velocity component (see FIGS. 14 and 15). This low velocity zone 17 extends into the extension module 7 but is less pronounced. Small animals and low speed swimmers tend to congregate in the lower velocity areas. The low velocity side zones 17 allow these smaller animals to swim back up the apparatus, in the tow direction T. When the smaller animals exit these side zones 17 near the escapements 9, 10 due to low velocity recirculating water, the higher velocity flow around the escapements 'sucks' the smaller animals directly through the escapements with minimal wall contact.

Aquatic animals smaller than the escapements 10 in the second escapement module 8 are able to swim forward out of the low velocity cod end portion 2, along the low velocity side zones 17 and escape through those escapements 10. As shown by the streamlines 7 module contains a radial component that further assists in directing small and weaker fish towards the escapements 10 in the second escapement module 8.

Figure 22:
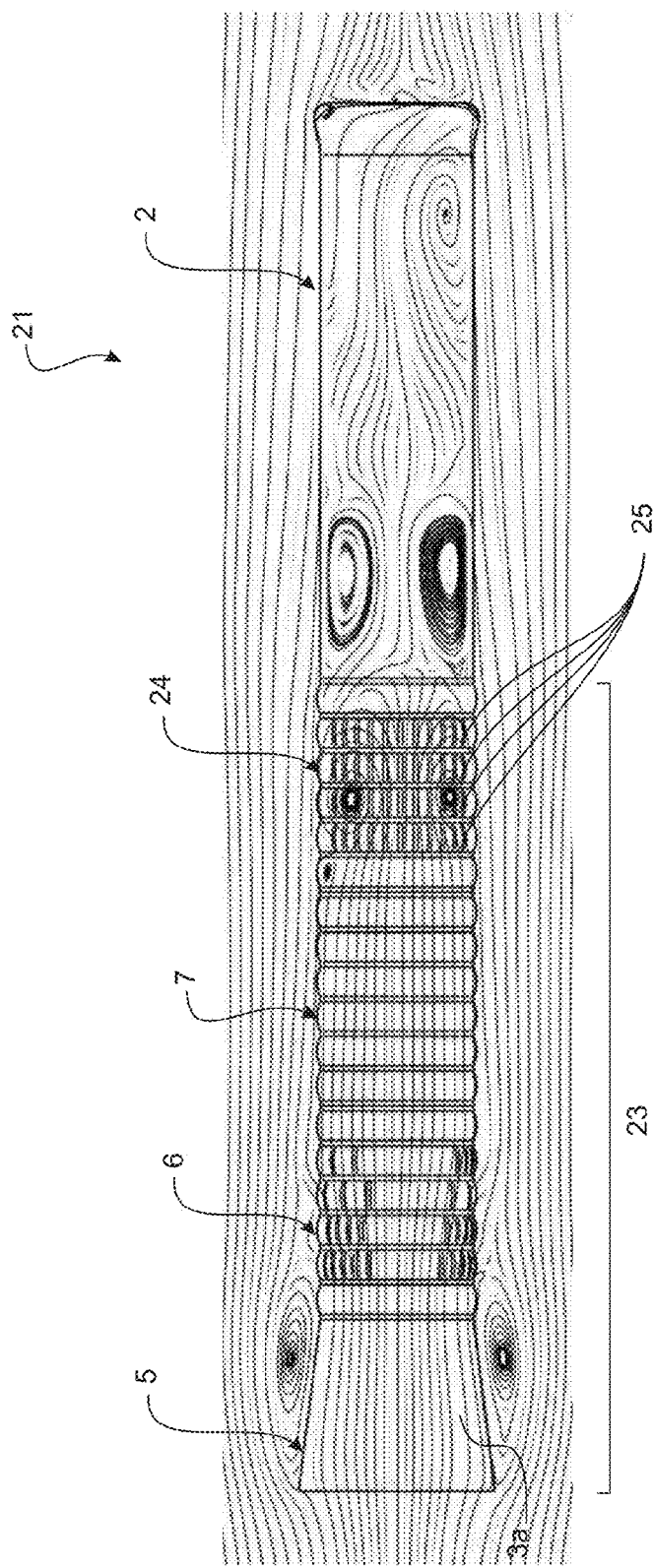
FIG. 22 is a port side view of the apparatus of FIG. 21 with streamlines to illustrate flow patterns in a vertical plane within and around the apparatus in use.
Figure 23:
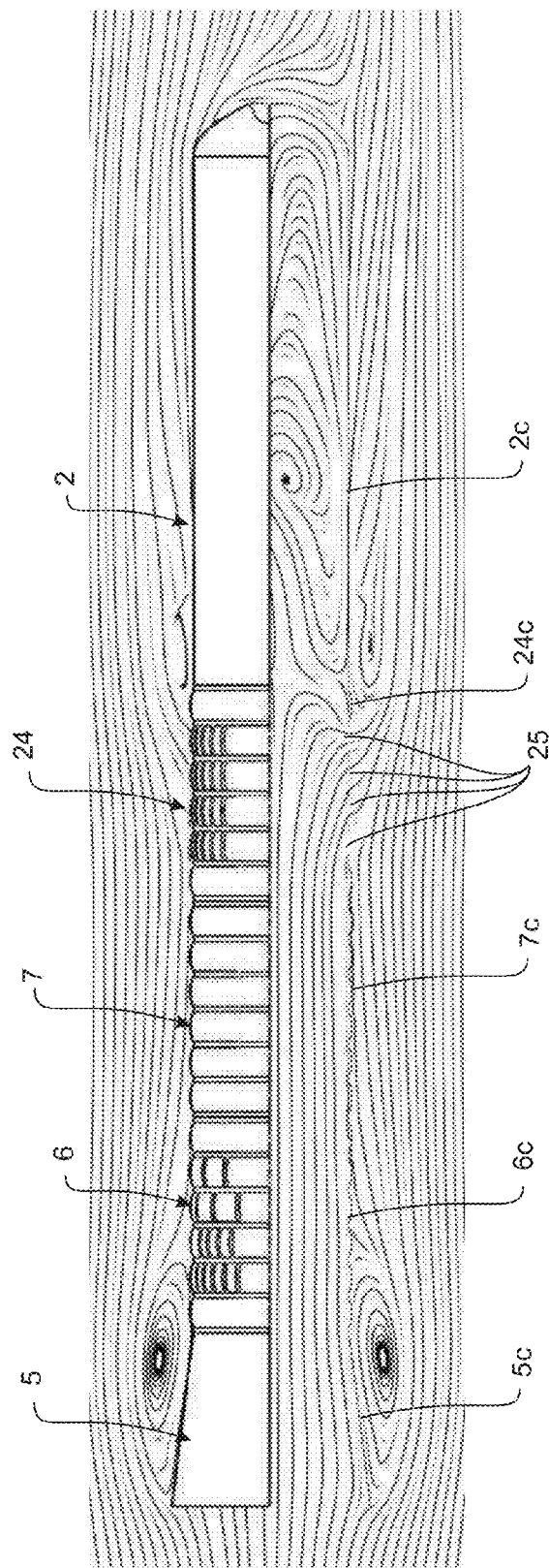
FIG. 23 is a top cutaway view of the apparatus of FIG. 21 with the port half of the apparatus cut away and streamlines to illustrate flow patterns in a horizontal plane within the port half of the apparatus and around the apparatus in use.

FIGS. 22 and 23 illustrate water flow in the second embodiment apparatus 21 of FIG. 21 having side escapements 25 in the second escapement portion 24. In that embodiment the gentle recirculation flow can be seen oriented at 90 degrees to the flow pattern seen in the first embodiment apparatus. This pattern would be useful in retaining fish such as barracouta that have strong instincts to move towards the sea surface. These fish will be re-circulated back towards the top surface of the apparatus while other species can be re-circulated or directly swept to the lateral escapements. Larger, stronger aquatic animals can swim further forward in the faster moving water and into the first lengthener module 6, to the larger escapements 9, 10. If they are smaller than a given escapement, the animals can elect to exit the apparatus 1 through that escapement 9, 10.

In the embodiments of the present invention, areas with increased flow rate are limited to very small, localised regions near some escapements 9, 10. Therefore, captured animals are held in a relaxed, low stress environment and can choose to exit through the escapements, rather than being forced through the escapements 9, 10. Fish or other organisms that are larger than the escapements 9, 10 will feel the pressure caused by the high velocity flow outside the apparatus, and will swim away from the escapements further into the interior of the apparatus. This is in contrast to existing trawl nets with escapement features, which try to direct fish to the escapements using ramps or other features to increase the flow rate inside the net in an attempt to match the velocity of the flow outside the net.

Because the animals in the cod end 2 are not crushed and are kept in a low stress state in which they are able to move about in the low speed cod end, they may be kept in the apparatus 1 for a much longer period of time than fish trapped in the cod end of a traditional net. This means the apparatus 1 of the present invention may be held at depth and/or towed for a longer period of time than traditional nets, extending possible harvest durations. For example, it may be possible to tow the apparatus for more than 12 hours, or for several days while still harvesting relaxed, undamaged animals. Even if animals are damaged or stressed during initial capture, they are able to recover in the low flow in the cod end portion. With traditional nets, such extended trawls could result in extremely damaged, degraded catches.

Once a suitable quantity of aquatic animals has been captured, the apparatus is raised to the surface by the lines or cables 61 operatively connected to the front end 3a of the apparatus. Because the captured animals are able to be held in the cod end portion 2 for an extended duration, the transit of the apparatus from depth to the surface can be controlled at a slower rate. This decreases injury due to decompression injury and changes in water temperature. In a traditional net, damage due to a fast transit time to the surface must be balanced against damage caused by extending the time the catch is retained in the net.

As the apparatus 1 is brought to the surface, water 'bleeds' off through the escapements and the captured animals positioned further forward in the apparatus move back in the apparatus to the cod end. Because the rear end of the apparatus is full of water, if the full apparatus is held in the surface waters, the 'washing' effect of waves at the surface of the sea on the animals is decreased when compared with a traditional net.

In traditional nets, as the net is raised to the surface, fish are exposed. Damaged animals and detritus from the catch attract predictors and scavengers such as birds, seals, sea lions, sharks and fur seals. In the current system, the apparatus obscures and covers the catch so there is less food released for predators and scavengers as the catch is brought to the surface and onboard. Because the catch is contained in a body of water, this enables in-situ treatments of the catch. For example, anaesthesia or other prophylactic treatment, for example parasite or sea lice treatments, may be administered to a catch contained in the cod end portion 2 without removing the fish from water and before emptying the catch onboard the vessel.

FIGS. 24 to 28 illustrate steps for a preferred method of raising the apparatus 1 from the body of water and emptying the harvested catch onto the towing vessel.

Figure 24:
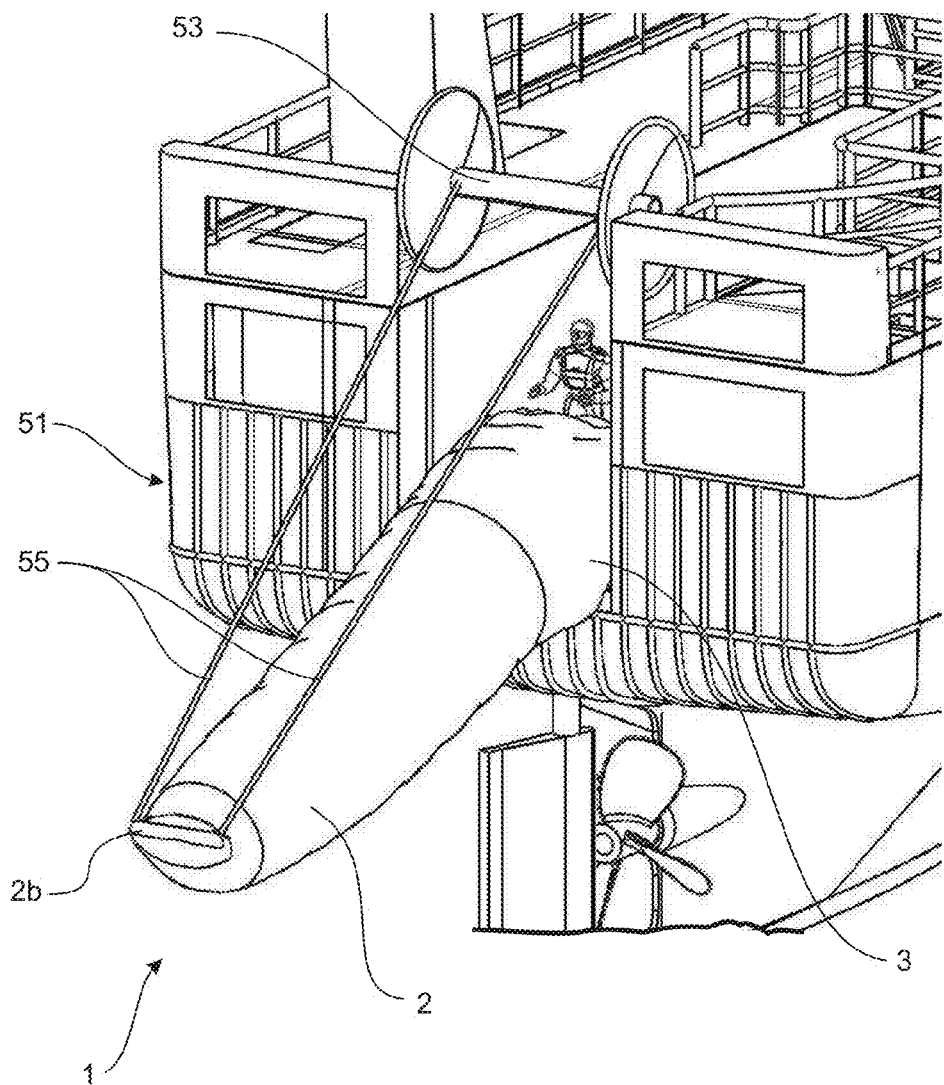
FIG. 24 is a rear perspective view showing a first step of a preferred embodiment method for retrieving a harvested catch from an apparatus according to the present invention onto a marine vessel.
Figure 25:
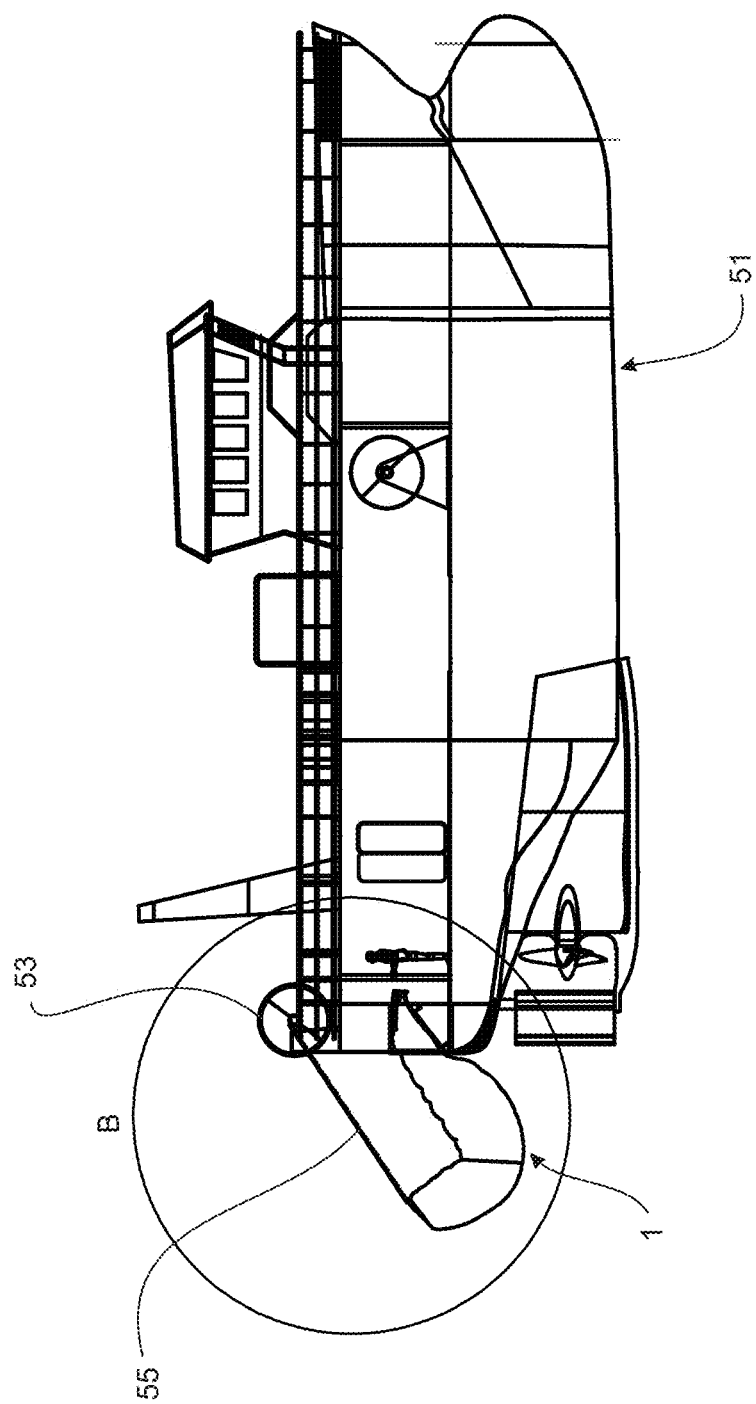
FIG. 25 is a side view showing a second step of the method of retrieving a harvested catch and showing the position of the apparatus relative to the marine vessel.
Figure 26:
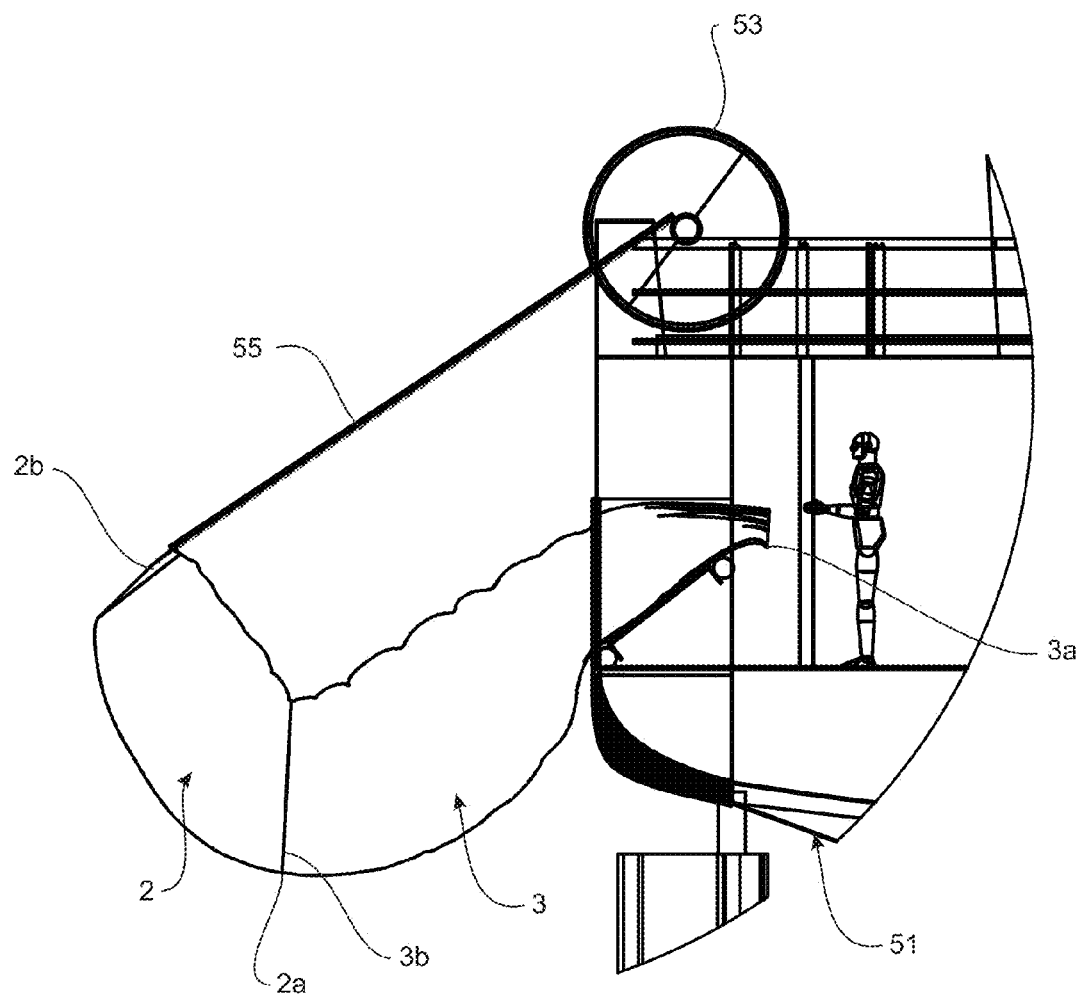
FIG. 26 is a side view showing an enlargement of the detail B in FIG. 25
Figure 27:
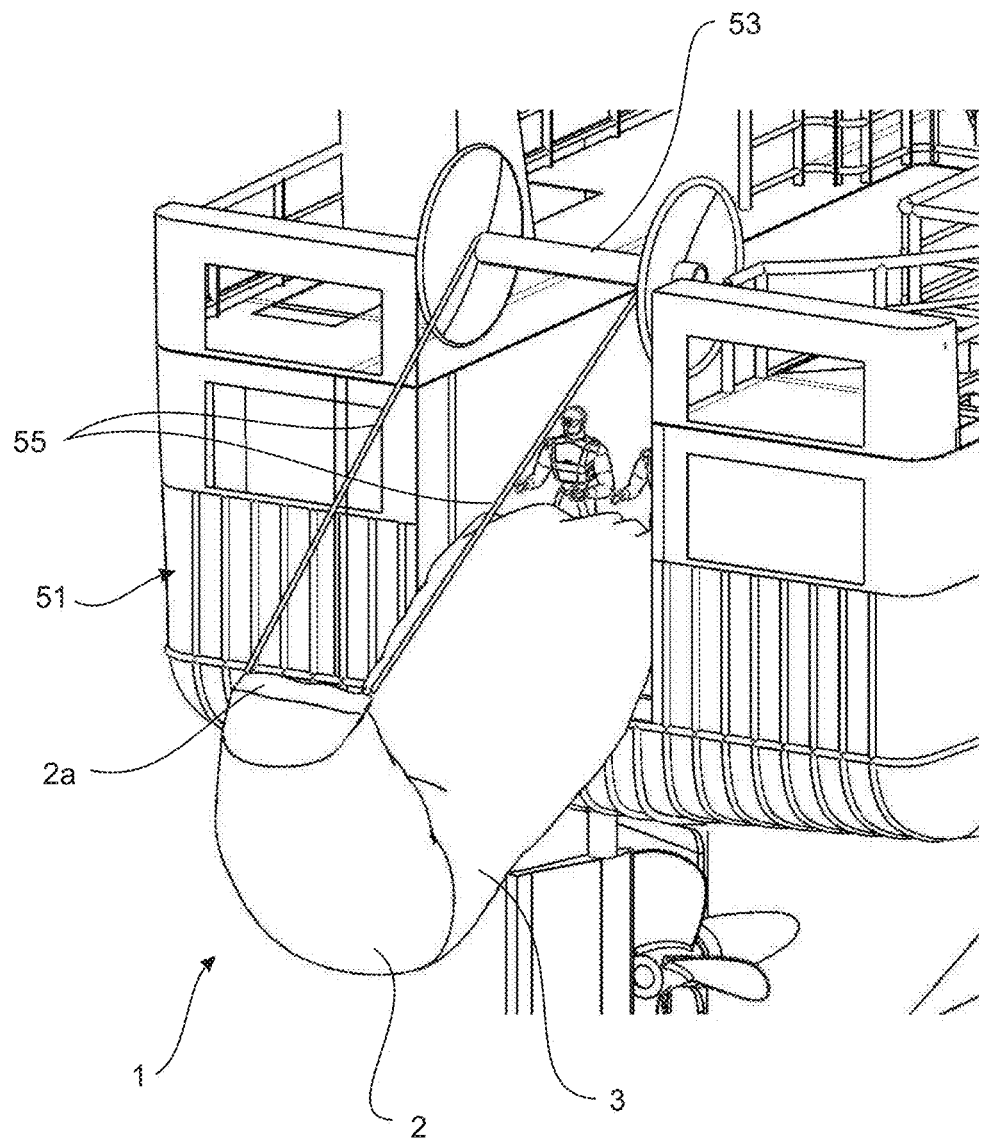
FIG. 27 is a rear perspective view corresponding to FIG. 26.

In a first step shown in FIG. 24, once the apparatus 1 is near the water surface, the mouth 3a of the apparatus is pulled forward and upwards by cables or lines 61 operatively connected to the mouth 3a or the apparatus, and onto the vessel 51 so that the mouth of the apparatus is positioned over the deck of the vessel 51, preferably at the vessel's stern. If the leading end 3a of the apparatus is attached to a net lengthener and/or sweep wings, the apparatus is pulled up via the cables or lines and the net lengthener and/or sweep wings. The net lengthener and/or sweep wings are also raised onboard the vessel and may be detached from the apparatus or moved out of the way of the leading end 3a of the apparatus.

At least one rear lift line 55 is attached to the rear end 2b of the cod end 2 and to a winch, drum 53 or other device onboard the vessel, to reel in the line. As the rear end 2b of the apparatus is raised, the cod end 2 'folds' and the catch and water spill out of the open front end of the apparatus 1 and onto the vessel 51. FIGS. 25 to 28 illustrate the method of 'folding' the apparatus by raising the rear end 2b of the cod end portion. The rear end 2b of the cod end portion is moved upwards and forward so that a rear part of the cod end portion overlaps and is positioned vertically higher than a front part of the cod end portion.

When the apparatus 1 is removed from the body of water, water is retained in the cod end portion 2 due to its impervious walls and closed end 2b, rather than draining as in a traditional net. This water allows the aquatic animals to continue swimming in the cod end portion when the apparatus has been raised out of the water, reducing contact between aquatic animals and contact with the wall(s) of the apparatus, reducing the induced stress.

The rate at which the catch is emptied is controllable by controlling the rate at which the rear lift line(s) 55 is/are reeled in. This allows steady, controlled release of the catch, effectively operating the apparatus 1 as a fish pump to fluidly convey the fish onto the vessel 51. This eliminates any need for a pump to transfer the catch from the apparatus to the vessel. It is possible to release the catch at a rate that matches the processing rate onboard the vessel, thereby reducing the time that the animals are exposed on the deck of the vessel 51 awaiting processing.

Because the animals are emptied onto the vessel along with water, the water cushions the animals, reducing contact between animals as they are emptied. The water flowing out of the cod end portion 2 can be used to flow the catch into pounds or directly into the hold with minimal damage In addition, because the cod end 2 of the apparatus 1 is full of water, emptying of the apparatus can be controlled so that the most buoyant animals are released first. This can be advantageous in emptying by-catch such as puffer fish and undersize fish. Any unwanted animals can then be immediately released back into the sea, maximising the likelihood the released fish will survive.

It is not necessary to lift the entire cod end 2 from the water. By only raising the trailing end 2b of the cod end portion 2 while keeping some of the cod end portion 2 in the water, the hydrostatic pressure from the raised portion acts to 'pump' out some of the water and some of the catch. Because it is not necessary to lift the entire cod end at once, a lower capacity of the winch may be used. This provides the advantage that smaller vessels can be used for larger catches while still being able to stably lift and empty a full apparatus 1. This also reduces free surface effects from water sloshing around on the vessel because much of the weight of the full apparatus is suspended off the back of the vessel and supported in the water.

Some fishing vessels may operate a twin system utilising two preferred form apparatuses. While a first apparatus is being emptied and the catch processed on deck, a second apparatus may be towed to gather a second catch. The empty first apparatus may then be lowered for a further catch as the second apparatus is raised for emptying and processing.

Figure 28:
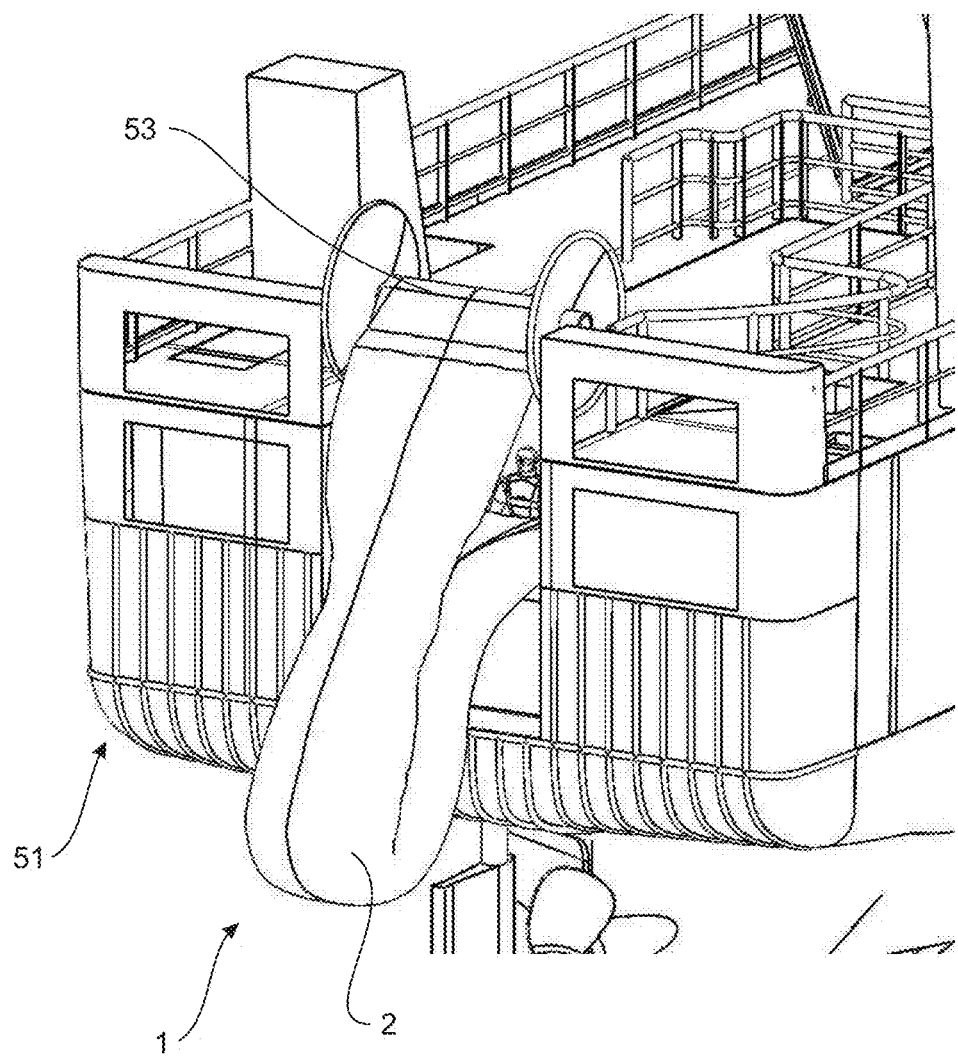
FIG. 28 is a rear perspective view showing a third step of the method of FIGS. 24 to 27.

In a final step shown in FIG. 28, the trailing end 2b of the cod end portion is raised above the mouth 3a of the apparatus. The cable 55 is fully reeled in and apparatus is then rolled up for storage around a drum 53 on the marine vessel 51. The apparatus preferably does not comprise any rigid stiffening components or diagonal or rigid grid components. That simplifies onboard handling or the apparatus and means the apparatus can be handled using existing equipment for handling traditional nets, for example rolled up around a drum on the rear of the vessel for compact storage. Alternatively the apparatus could be folded or otherwise rolled for storage.

In an alternative embodiment, rather than raising the trailing end 2b of the cod end portion 2 to pour out the catch, the entire apparatus 1 and catch may be hauled onboard the vessel. As the apparatus 1 is hauled onto the vessel, the water in the cod end portion 2 cushions the captured aquatic animals, thereby minimising damage to the aquatic animals from impact with the vessel. The portion 3 of the apparatus 1 in front of the cod end portion 2 may collapse as the apparatus is pulled onto a boat, thereby substantially closing the escapement 9, 10.

The catch may then be emptied out of the leading end 2a of the cod end portion 2 by unstitching the anterior end of the cod end and releasing the catch. Alternatively, the catch may be emptied by opening the trailing end 2b of the cod end portion 2 to allow the passage of aquatic animals from the interior of the apparatus 1 to the exterior of the apparatus. In such an embodiment, the trailing end 2b may comprise a suitable feature such as by a zip-type or cord arrangement, for example, so it may be closed off for trawling and opened to release the catch.

Experimental Results and Observations

A series of experimental tows of a sufficient number to ensure confidence in the results were carried out in New Zealand fisheries using the apparatus 1 of FIGS. 1 to 4 to evaluate the effectiveness of the apparatus 1. The apparatus additionally had some apertures in wall(s) of the extension module 7, although such apertures may not be present. For the experimental tows, the escapements in the first and second escapement modules were short slot-type escapements 42, 43 (FIG. 10) with a total open area of the escapements of 50-60% of the swept area of the mouth of the entry cone 5a. Escapement sizes that were tested were 125 mm×35 mm (60% ratio of open area to swept area) and 90 mm×35 mm (50% ratio of open area to swept area).

Figure 29:
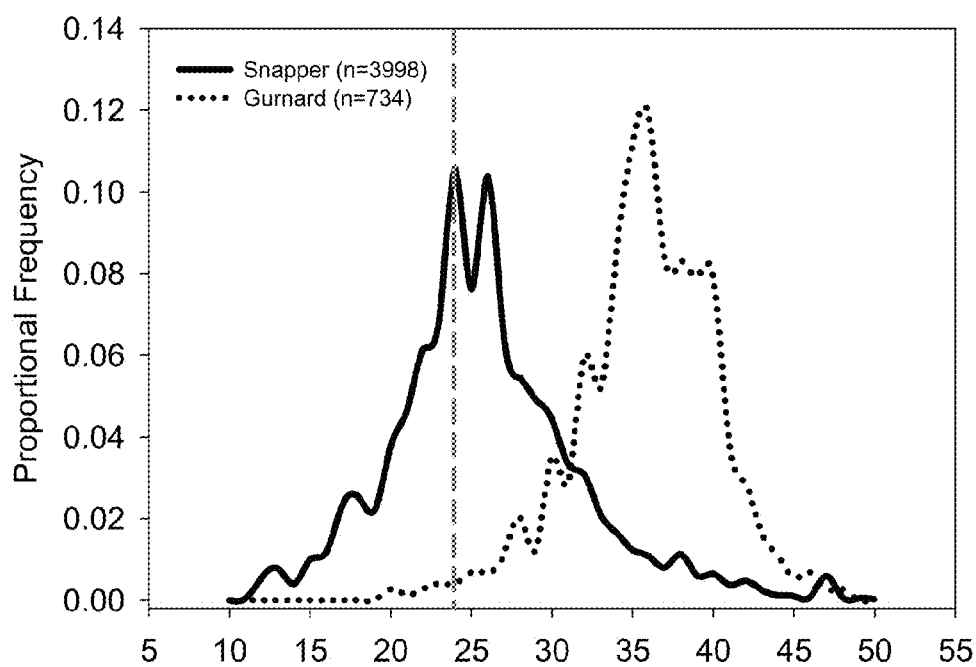
FIG. 29 is a graph of the length of gurnard and New Zealand snapper caught using the apparatus of FIGS. 1 to 4 in experimental tows.
Figure 30:
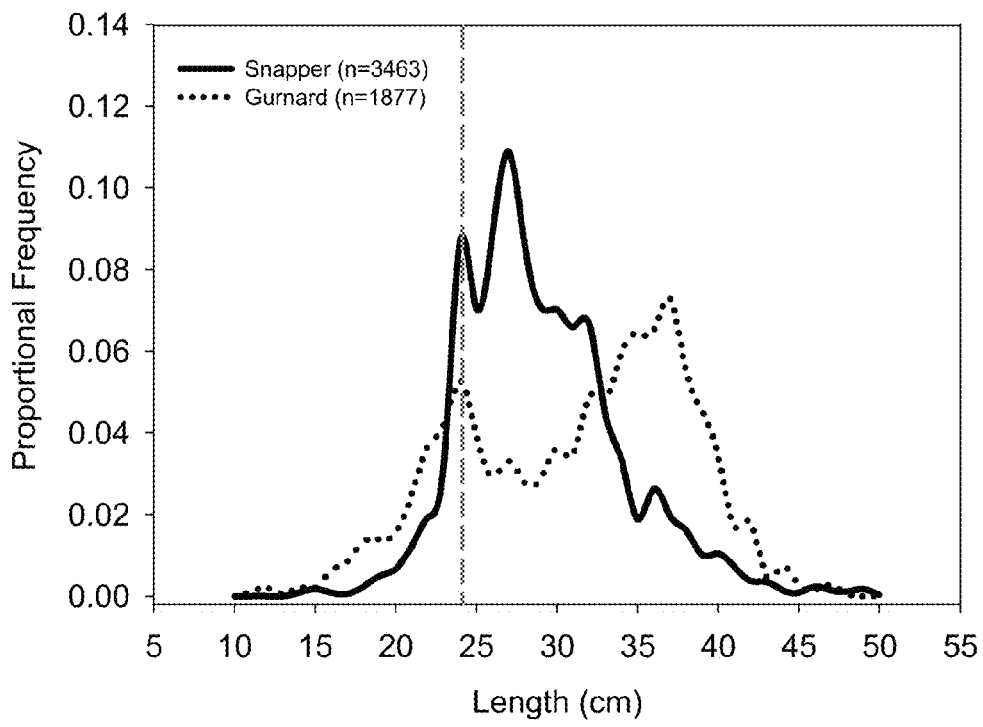
FIG. 30 is a graph of the length of gurnard and New Zealand snapper caught using a conventional trawl net fitted with a 5 inch mesh cod end, in comparison tows.

Corresponding tows were carried out under similar conditions using a conventional mesh trawl net fitted with an industry standard 5 inch mesh cod end. FIGS. 29 and 30 show the length distributions of the New Zealand snapper and gurnard captured over the tows using the apparatus 1 (FIG. 29) and the conventional net (FIG. 30).

New Zealand snapper and gurnard display different behavioural characteristics. Snapper are semi-pelagic and are averse to voluntarily swimming through apertures, even if those apertures are much larger than the fish's dimensions. In contrast, gurnard are a benthic species and accustomed to resting on or near surfaces. Gurnard have large heads, spikes and large pectoral fins. These features mean gurnard are easily caught in the mesh of conventional nets and therefore are generally captured in a non-discriminatory way.

As illustrated in FIGS. 29 and 30, the size retention profiles for both methods (an apparatus 1 according to the present invention compared with a conventional net) are significantly different.

In the tows using a conventional mesh cod end, the size retention profiles for gurnard and snapper were quite similar. About 22% of the gurnard catch and about 17% of the snapper catch using the conventional net were below 24 cm in length. That shows that in a conventional mesh, the selection of animals is based on physical screening. That is, physical size of the animals relative to the mesh size, irrespective of species, determines retention. Morphology or behaviour of different species did not appear to have any significant effect on fish selection. In the conventional 5 inch mesh cod ends, fish below 5 inches in width may escape through the net unharmed, but often do not survive even after escaping due to damage or exhaustion.

In contrast, in the tows using the apparatus 1, the size retention profiles for gurnard and snapper were very different. Only 1.5% of the gurnard catch was under 24 cm in length, compared to 43% of the snapper catch. In the apparatus 1, physical screening has a significantly reduced effect. The apparatus 1 provided flow velocities and patterns that allowed the snapper to avoid surfaces while supporting the opposite behaviour in the gurnard. This phenomenon may be enhanced by designing lengthener modules, escapement patterns and apertures that produce internal flow patterns that gently recycle animals into proximity of the escapements 9, 10.

In conventional trawling exhausted organisms accumulate in the mesh cod end bag. Small animals can escape (or fall) through the meshes, but the majority experience frequent contact with the fishing gear, other animals and debris. This is further compounded by turbulence with the cod end and prolonged exposure to these conditions (typically 4 to 6 hours but it may be as long as 12 hours). On transfer to the deck of the vessel the fish are subjected to increased compaction, contact with other animals and contact with fish processing and handling equipment.

In-trawl videography was used to observe animal behaviour in the apparatus 1. Behavioural observations and damage measurements from the experimental tows show that the apparatus 1 alleviates many of these deficiencies.

Internal conditions within the apparatus 1 can be tailored to the requirements of the target organisms. The inflated structure substantially reduces animal to animal contact. The low internal turbulence and water velocity reduces fatigue in the retained animals. Undamaged animals with close to normal energy levels have the sensory and behavioural capacity to protect themselves and avoid damage during the capture and post-capture handling processes.

The apertures 9, 10 reduced the water velocity and turbulence to within the tolerances of the target species, allowing the target species to choose its preferred location within the apparatus or be behaviourally manipulated towards a preferred zone. In addition to providing a low velocity, low turbulence environment, the water flow within the apparatus 1 can be structured to ensure that animals have multiple chances to move to escapement or retention zones. The apparatus provided flow velocities and patterns that allowed the snapper to avoid surfaces while supporting the opposite behaviour in the gurnard.

During the experimental trawls, snapper in an undamaged, un-exhausted condition and in a low turbulence, low velocity environment were able to express their surface-aversive behaviour in response to the membrane walls. Gurnard exposed to the same conditions voluntarily approached the flexible membrane surfaces of the apparatus 1, and into proximity of escapements, which they were then transported out through.

Conditions within conventional mesh cod ends are chaotic, constrained and hostile. The fish are physically screened or are attracted to the open appearance of the mesh. In contrast, the soft, open apertures in the membrane of the apparatus 1 release most fish with little damage. In this example, the gurnard were released quickly at depth close to the environment in which they were captured while the small snapper were retained essentially undamaged and with high energy reserves.

Figure 31:
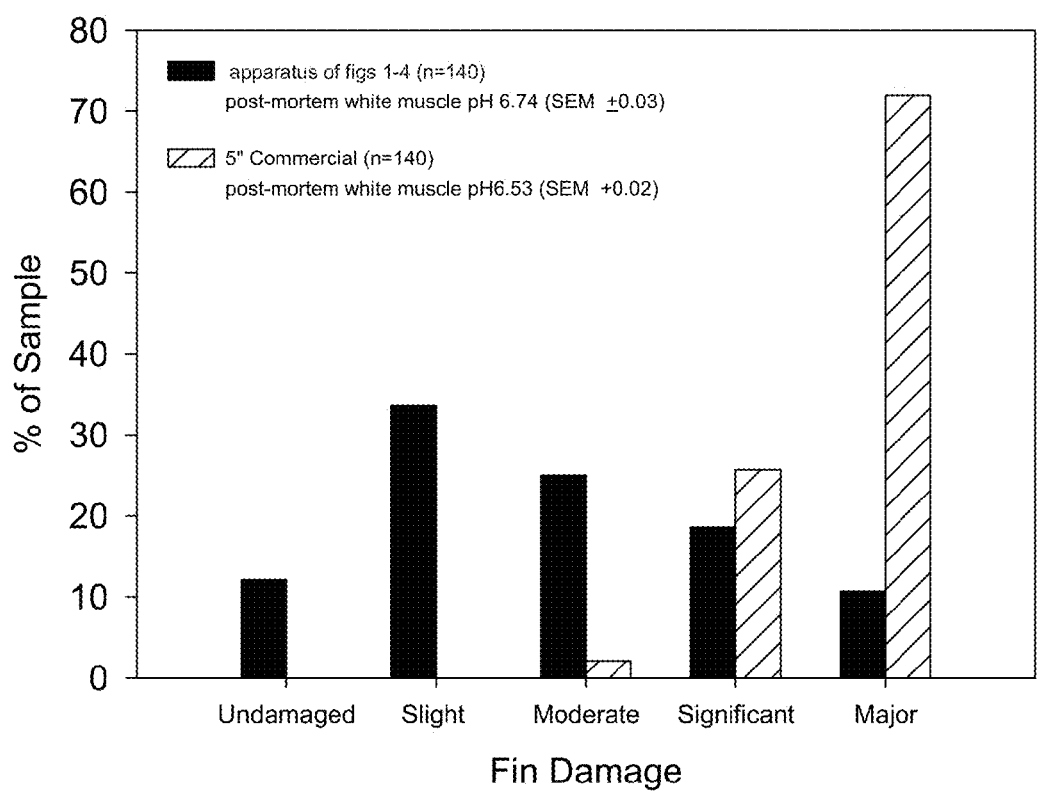
FIG. 31 is a graph showing fin damage in a sample of fish caught using the apparatus of FIGS. 1 to 4 compared with a sample of fish caught using a conventional trawl net fitted with a 5 inch mesh cod end.

FIG. 31 shows the amount of fin damage to a sample of 140 New Zealand snapper captured using each of the apparatus of FIGS. 1 to 4, and a conventional 5 inch knotless mesh cod end. The tow durations were relatively short (123 minutes±14.5 SD). While the apparatus was lifted onto the deck generally using the method described above with reference to FIGS. 24 to 28, the catch was spilled onto the deck of the marine vessel. This is therefore a conservative measure as it doesn't take into account the additional reduction in damage to captured animals that could be achieved by optimal handling of the animals as they are emptied from the apparatus, or the more pronounced differences in damage that would occur in extended duration tows.

The amount of external damage incurred by marine organisms on capture is an excellent, non-invasive indicator of the effectiveness of the capture method. External damage indicates fish to fish, fish to capture equipment, and fish to hard surface contact. High levels of external damage correlate closely with exhaustion, internal injury and poor post-capture survival. Higher levels of external damage therefore directly correlate with a loss of 'as harvested' appearance and increased incidence of product defects, increased waste and ultimately low product value.

Fin damage assessment is a particularly sensitive and robust integrator of the wide range of external and internal injuries incurred during capture. The fins are very delicate bony fin rays and tissue webbing structures. They are very easy to damage and are often the first tissues to be damaged during capture and handling.

The damage to each snapper fin ray was assessed and categorised as undamaged, slight damage, moderate damage, significant damage, or major damage according to the following criteria:
  Undamaged (score 0)—no damage or only minor fraying on the very edge of the fins
  Slight (score 1)—less than 2 mm of the tip of a fin ray is exposed, and only 3 or fewer fin ray tips exposed
  Moderate (score 2)—approximately 2-5 mm of the tip of a fin ray is exposed, and/or more than 3 of fin ray tips exposed
  Significant (score 3)—more than 5 mm of the tip of a fin ray is exposed, tears up to 50% length of fin rays from base to tip, or only 1 tear to base of fin if any other damage is minimal
  Major (score 4)—several tears, tears over 50% length of fin rays from base to tip, or any bent or broken fin rays.

The average damage score for the snapper sample caught using the conventional 5 inch cod end was 3.7 (out of 4), whereas the average damage score for the apparatus 1 was 1.8. FIG. 31 shows that about 98% the snapper sample caught using the conventional 5 inch cod end had significant or major external damage. In contrast, almost half (46%) the snapper sample caught using the apparatus 1 according to the present invention were undamaged or had only slight damage.

The above damage scores closely agree with fin damage measures from a sample of 833 animals over repeated experimental tows using the apparatus 1, which found an average damage score of 1.7; and a sample of 490 animals over repeated conventional tows which found an average damage score of 3.5.

In addition to the fin damage assessments, white muscle cut surface pH was measured for a sub-sample of twenty New Zealand snapper from the comparison tows.

White muscle pH measurements serve as a useful indicator of muscle fatigue and muscle tissue energy reserves. Normal physiological pH values of above 7.3 indicate that the muscle tissue is substantially rested and that the animal has not strenuously exercised. In New Zealand, snapper values around 6.8 indicate viable animals that have experienced moderate to strenuous exercise while values of 6.5 indicate extreme, often non-recoverable fatigue. Rested muscle tissue is highly desirable and produces a consistent, defect-free, high value 'sashimi grade' product. High retained energy reserves indicate that the animal has not struggled significantly during capture.

Snapper landed using the apparatus 1 showed a mean white muscle pH value of 6.74 (±0.03 SEM), with a range of 6.4 to 7.3. The sub-sample from the conventional tow showed a mean post mortem muscle pH of 6.53 (±0.02 SEM), with a range of 6.5 to 6.9.

Overall, the higher pH score for the animals captured using the apparatus shows that those animals are more rested than conventionally captured animals. Rested animals have less internal and external damage and are highly likely to survive post-capture release. This energy difference was evident from the behaviours of the captured fish onboard the vessel—conventionally caught snapper had very little ability to struggle when spilled onto the deck of the marine vessel. However, snapper caught using the apparatus 1 had significant energy reserves at the end of the trawls.

The results show the versatility of the apparatus 1. The apparatus 1 can select for juveniles in ways not available with conventional mesh-based equipment. Both methods captured comparable numbers of snapper over 24 cm in length. However, the apparatus 1 actively retained healthy small snapper. In the apparatus according to the present invention 1, under-size snapper that were captured in the cod end 2 had low levels of damage and, because of the low turbulence conditions, were un-exhausted and had energy reserves. Therefore under-size snapper could be released after the apparatus had been retrieved with a high chance of survival. Alternatively, the juveniles could be used as the basis for on-rearing aquaculture or re-seeding. That is in contrast to the undersize fish caught in the conventional net that experienced high damage and fatigue level and were much less likely to survive upon release. Alternative configurations of escapements will readily allow behavioural and physical redirection of the small fish. Embodiments of the present invention have been described above by way of example only, and modifications can be made thereto without departing from the scope of the invention.

For example, the apparatus 1 has been described as having a lengthener portion 3 with three lengthener modules 6, 7, 8 and an entrance cone 5. Alternatively the lengthener portion 3 may not comprise an entry cone and/or may comprise a single lengthener or any other number of lengthener modules connected in series. The apparatus is described as having two spaced apart escapement modules 6, 8. Alternatively the apparatus 1 may comprise only a single escapement module with one or a plurality of escapement regions, or the apparatus may comprise three, four, or any other number of escapement modules. The escapement modules may be adjacent each other or separated by blank extension modules.

In one embodiment, the cod-end portion 2 and the lengthener portion 3 could be integral.

A system having a plurality of lengthener modules 6, 7, 8 is customisable for different applications by rearranging, substituting, removing and/or adding various lengthener modules. Preferably the internal transverse dimensions of the lengthener modules 6, 7, 8 are all equivalent to facilitate this interchangeability. Preferably the modules are also the same length. However, alternatively the modules may have different lengths and/or different internal dimensions. For example, one or more lengthener modules may be tapered so that its leading end has a greater internal transverse dimension than its trailing end.

The cod end 2 and elongate lengthener portion 3 are described as being substantially cylindrical when the apparatus is expanded. In alternative embodiments, the cod end 2 and/or the lengthener portion 3 may have a different cross-sectional configuration when the apparatus is expanded, such as an elliptical or polygonal configuration. By way of example, the lengthener portion may have a substantially square, rectangular, hexagonal, or octagonal cross-sectional configuration when the apparatus is expanded.

As another example, the apparatus could be provided with internal bracing to assist with forming the desired inflated shape of the apparatus.

The embodiments described above are designed to retain species larger than a given size and eject undersized fish. Alternative embodiments may be configured to capture juveniles of desired species. One such embodiment may have smaller escapements in the escapement module 8 nearest the cod end portion 2, and may comprise more or longer extension modules 6 to space the juvenile fish in the cod end portion 2 further from any larger escapements and/or high velocity flows in anterior escapement modules. The towing velocity of the apparatus may also be reduced to enable adult or larger animals to swim forward from the cod end portion and out through the anterior escapements.

The above method is specific to a method of trawling. Alternatively the apparatus 1, 21 may be used in other harvesting or aquaculture methods. For example, in one embodiment method the apparatus 1, 21 is placed and held stationary in a body of flowing water such as a river, with the leading end of the lengthener portion 3a upstream of the cod end portion 2. The current in the river produces relative water flow with the apparatus 1, 21.

In traditional seine fishing, much of the damage to the captured animals is incurred when the animals are forced in to the net cod end. In an alternative embodiment method the apparatus 1, 21 may be used in seine harvesting, for example by replacing the cod end of a traditional seine net with an apparatus according to the present invention. As the seine net and attached apparatus 1, 21 are winched in to harvest the accumulated animals, the animals flow into the apparatus 1, 21. The animals are then retained in the cod end portion 2 until they are retrieved from the apparatus using any of the methods discussed above. This technique is suitable for various types of seining, for example Scottish or Danish seine fishing, or lake seine fishing, for example to capture catfish. If the winch speed of the apparatus is slow, floats may be attached to the apparatus to keep the apparatus open.

The method above describes emptying the harvested catch from the apparatus 1, 21 onto a marine vessel 51. Alternatively, the catch may be emptied to an alternative delivery zone such as an offshore holding facility, or directly onto a land-based area.

The invention claimed is:

1. An apparatus for harvesting aquatic animals, comprising:
   a cod end portion having an open leading end and a closed trailing end and one or more side walls between the leading end and the trailing end, wherein the side wall(s) comprise(s) a flexible membrane and wherein the side wall(s) and the trailing end are substantially impervious to water; and
   an elongate lengthener portion having a leading end, a trailing end, and one or more side wall(s) between the leading end and the trailing end, wherein at least a majority of the side wall(s) comprise(s) a flexible membrane that is substantially impervious to water, and wherein the trailing end of the lengthener portion is operatively connected to the leading end of the cod end portion;
   wherein the elongate lengthener portion comprises a plurality of escapements through which aquatic animals that are smaller than a desired size and water can pass from an interior of the apparatus to an exterior of the apparatus to cause a general reduction in the water flow rate inside the apparatus from the leading end of the elongate lengthener portion toward the trailing end of the elongate lengthener portion and toward the trailing end of the cod end portion when the apparatus is submerged in a body of water and there is water flow relative to the apparatus.

2. An apparatus as claimed in claim 1, configured such that when the apparatus is submerged and there is water flow relative to the apparatus, the average water velocity in the cod end portion relative to the apparatus is less than about 10% of the relative water velocity outside the apparatus.

3. An apparatus as claimed in claim 1, wherein the escapements are formed in the flexible membrane.

4. An apparatus as claimed in claim 1, wherein at least one of the escapements comprises a slit in the side wall or one of the side walls of the elongate lengthener portion.

5. An apparatus as claimed in claim 1, wherein at least one of the escapements comprises a slot or other aperture in the side wall or one of the side walls of the elongate lengthener portion.

6. An apparatus as claimed in claim 1, wherein the elongate lengthener portion comprises an escapement portion wherein an upper region of the escapement portion comprises a plurality of escapements, a lower region of the escapement portion comprises a plurality of escapements, and two opposite side regions of the escapement portion are substantially impervious to water, and wherein the elongate lengthener portion comprises a plurality of lengthener modules arranged in series, each lengthener module having a leading end and a trailing end.

7. An apparatus as claimed in claim 6, wherein the plurality of lengthener modules comprises a first escapement module comprising a plurality of escapements through which aquatic animals that are smaller than a desired size and water can pass from an interior of the apparatus to an exterior of the apparatus.

8. An apparatus as claimed in claim 7, wherein the plurality of lengthener modules further comprises an extension module that is substantially impervious to water.

9. An apparatus as claimed in claim 8, wherein the plurality of lengthener modules further comprises a second escapement module comprising a plurality of escapements through which aquatic animals that are smaller than a desired size and water can pass from an interior of the apparatus to an exterior of the apparatus, and the extension module is positioned between the first and second escapement modules.

10. An apparatus as claimed in claim 9, wherein the first escapement module is positioned forward of the second escapement module, and the plurality of escapements in the first escapement module are larger than the plurality of escapements in the second escapement module.

11. An apparatus as claimed in claim 1, configured such that when the apparatus is submerged and there is water flow relative to the apparatus, the total open area provided by the escapements is less than 5% of the total wall area of the lengthener portion.

12. An apparatus as claimed in claim 1, configured such that when the apparatus is submerged and there is water flow relative to the apparatus, the total open area provided by the escapements is less than about 60% of the cross sectional area of a front of the leading end of the lengthener portion.

13. An apparatus as claimed in claim 1, wherein the cod end portion is configured such that aquatic animals in the cod end portion will be retained and cushioned in water when the apparatus is pulled onto a boat from its leading end.

14. An apparatus as claimed in claim 1, configured to self-inflate upon being towed through a body of water from its leading end.

15. An apparatus for harvesting aquatic animals, comprising:
   a cod end portion that is substantially impervious to water other than an open leading end thereof; and
   an escapement module operatively connected to the cod end portion and positioned forward of the open leading end of the cod end portion, having an open leading end, an open trailing end, and a wall portion between the open leading end and the open trailing end, wherein the wall portion comprises a flexible membrane, at least a majority of the wall portion being substantially impervious to water, and wherein a plurality of escapements are formed in the flexible membrane of the wall portion, wherein aquatic animals that are smaller than a desired size can pass from an interior of the apparatus to an exterior of the apparatus through the escapements;
   wherein water can pass through the escapements, from an interior of the apparatus to an exterior of the apparatus to cause a general reduction in the water flow rate inside the apparatus from the leading end of the escapement module toward the trailing end of the escapement module and toward a trailing end of the cod end portion when the apparatus is submerged in a body of water and there is water flow relative to the apparatus.

16. A method of harvesting aquatic animals comprising the steps of:
   submerging an apparatus as claimed in claim 1 in a body of water and positioning and/or moving the apparatus such that there is water flow relative to the apparatus and through the escapements so that the flow rate of water inside the apparatus generally reduces from the leading end of the elongate lengthener portion toward the trailing end of the elongate lengthener portion and toward the trailing end of the cod end portion; and
   capturing aquatic animals in the apparatus while providing a relaxed low flow rate environment for the aquatic animals in the apparatus, and allowing aquatic animals that are smaller than a desired size escape through the escapements.

17. A method as claimed in claim 16, comprising towing the apparatus through the body of water.

18. A method as claimed in claim 16, comprising generating a water velocity in the cod end portion relative to the apparatus of less than about 10% of the relative water velocity outside the apparatus.

19. A method of harvesting aquatic animals as claimed in claim 16, further comprising the step of raising the apparatus from its leading end until the leading end of the apparatus is on or over a delivery area for the animals, while maintaining aquatic animals in the cod end portion in a pool of water.

20. A method of harvesting aquatic animals as claimed in claim 19, further comprising causing aquatic animals of at least a desired size to flow back into the cod end portion as the apparatus is raised.

21. A method as claimed in claim 19, further comprising raising the trailing end of the cod end portion and thereby causing water and animals to flow out of the apparatus.

22. A method as claimed in claim 19, wherein the delivery area is onboard a marine vessel.

23. A method of assembling an apparatus for harvesting aquatic animals comprising the steps of:
   providing a cod end portion having an open leading end and a closed trailing end and one or more side walls between the leading end and the trailing end, wherein the side wall(s) comprise(s) a flexible membrane and wherein the side wall(s) and the trailing end are substantially impervious to water;
   providing a first escapement module having a leading end, a trailing end, and one or more side wall(s) between the leading end and the trailing end, wherein at least a majority of the side wall(s) comprise(s) a flexible membrane that is substantially impervious to water, and comprising a plurality of escapements through the side wall(s); and
   operatively connecting the trailing end of the first escapement module to the leading end of the cod end portion so as to form an apparatus in which, when the apparatus is submerged and there is water flow relative to the apparatus, water can pass from an interior of the apparatus to an exterior of the apparatus through the escapements to cause a general reduction in the water flow rate inside the apparatus from the leading end of the escapement module toward the trailing end of the escapement module and toward the trailing end of the cod end portion, and aquatic animals that are smaller than a desired size can pass from an interior of the apparatus to an exterior of the apparatus through the escapements.

24. A method as claimed in claim 23, further comprising providing a second escapement module having a plurality of escapements through which aquatic animals that are smaller than a desired size can pass from an interior of the apparatus to an exterior of the apparatus, and operatively attaching a leading end of the second escapement module to the trailing end of the first escapement module, and a trailing end of the second escapement module to the leading end of the cod end portion, so that the second escapement module is positioned between the first escapement module and the cod end portion.

25. A method as claimed in claim 24, further comprising providing an extension module that is substantially impervious to water, and operatively attaching a leading end of the extension module to the trailing end of the first escapement module, and a trailing end of the extension module to the leading end of the second escapement module, so that the extension module is positioned between the first escapement module and the second escapement module.

* * * * *